United States Patent [19]

Suzuki

[11] Patent Number: 5,388,900
[45] Date of Patent: Feb. 14, 1995

[54] CRAWLER PAD

[75] Inventor: Tatsuo Suzuki, Kanagawa, Japan

[73] Assignee: Kabushiki Kaisha Suzuki Shoji, Japan

[21] Appl. No.: 86,999

[22] Filed: Jul. 7, 1993

[30] Foreign Application Priority Data

| | | | |
|---|---|---|---|
| Jul. 15, 1992 | [JP] | Japan | 4-055172[U] |
| Aug. 12, 1992 | [JP] | Japan | 4-061966[U] |
| Dec. 3, 1992 | [JP] | Japan | 4-089603[U] |
| May 31, 1993 | [JP] | Japan | 5-028892[U] |
| May 31, 1993 | [JP] | Japan | 5-028901[U] |

[51] Int. Cl.⁶ .................................. B62D 55/275
[52] U.S. Cl. ............................. 305/54; 305/39; 305/51
[58] Field of Search .................. 305/39, 46, 51, 54

[56] References Cited

U.S. PATENT DOCUMENTS

| | | | |
|---|---|---|---|
| 1,503,611 | 8/1924 | Springer | 305/51 |
| 2,869,932 | 1/1959 | Eichweber . | |
| 3,261,646 | 7/1966 | Pax . | |
| 3,666,327 | 5/1972 | Padilla . | |
| 4,068,905 | 1/1978 | Black et al. . | |
| 4,109,971 | 8/1978 | Black et al. . | |
| 4,165,906 | 8/1979 | Fix | 305/51 |
| 4,359,248 | 11/1982 | Kortering . | |
| 4,597,612 | 7/1986 | Kaizaki | 305/51 |

FOREIGN PATENT DOCUMENTS

| | | | |
|---|---|---|---|
| 565166 | 11/1923 | France . | |
| 748081 | 4/1933 | France . | |
| 748081 | 6/1933 | France | 305/51 |
| 968280 | 11/1950 | France . | |
| 1035422 | 8/1953 | France . | |
| 2060689 | 5/1971 | France . | |
| 928144 | 4/1955 | Germany . | |
| 1135789 | 8/1962 | Germany . | |
| 1680332 | 7/1971 | Germany | 305/51 |
| 2657906 | 6/1978 | Germany | 305/51 |
| 3400702A1 | 7/1985 | Germany . | |
| 447519 | 2/1947 | Italy | 305/51 |
| 55-146383 | 10/1980 | Japan . | |
| 62-32138 | 8/1987 | Japan . | |
| 324485 | 3/1991 | Japan . | |
| 432330 | 7/1935 | United Kingdom | 305/51 |
| 794074 | 4/1958 | United Kingdom | 305/51 |

*Primary Examiner*—Russell D. Stormer
*Attorney, Agent, or Firm*—Ronald P. Kananen

[57] ABSTRACT

A crawler pad to be mounted on a tread surface of a crawler plate forming a crawler for forming an elastic tread for protecting a road surface, comprises an elastic member forming the tread of the crawler pad, a reinforcement supporting the elastic member, a fixed hook member integrally formed with the reinforcement for engaging with one edge of the crawler plate, a detachable hook member detachably secured at the other end of the reinforcement for engaging with the other edge of the crawler plate, and a fastening member for firmly securing the detachable hook to the other end of the reinforcement, the fastening member having an outer end placed at an inwardly shifted position relative to the outer end portion of the detachable hook member.

53 Claims, 68 Drawing Sheets

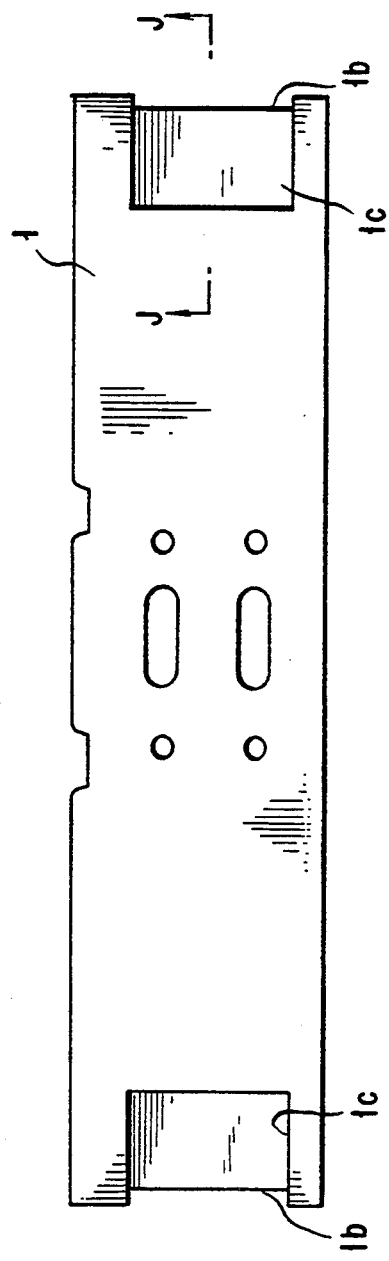
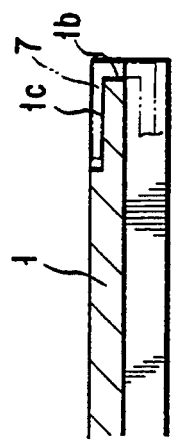
FIG. 18A
FIG. 18B

CRAWLER PAD

BACKGROUND OF THE INVENTION

1. Field of the Invention

The present invention relates generally to a crawler pad. More specifically, the invention relates to a crawler pad to be fitted on the tread side of crawler plates of a dry field crawler to be employed in a caterpillar type vehicle, such as a bulldozer, shoveldozer, power-shovel and so forth.

2. Description of the Related Art

Conventionally, for the purpose of protection of a road surface from a crawler, pads are fitted on the tread side of respective crawler plates forming a crawler.

Japanese Unexamined Utility Model Publication (Kokai) No. 3-24485 discloses a typical example of such type of crawler pads.

The conventional crawler pad is illustrated in FIG. 71. As shown, the conventional crawler pad comprises a pad body A formed of a hard rubber material into an essentially rectangular cross-section and hooking members c, c removably secured on longitudinal ends of the pad body a by means of fastening members, such as fastener bolts b, which hooking members c, c are adapted to engage with the edges of the crawler plate. The pad body A is formed with a groove d for engaging with a grouser of the crawler plate on the bottom surface thereof. The crawler pad is mounted on the crawler plate with engaging the groove d with the grouser of the crawler plate and engaging the hooking members c, c with the edges of the crawler plate so that the crawler pad will not cause displacing during traveling of the vehicle.

However, in the conventional crawler pad as set forth above, since the fastening bolts for securing the hooking members onto the pad body project from both sides of the pad, they may contact with bump or other matters on the traveling path to damage the bolts per se as well as the hooking members to loose off.

Also, in the prior art, since prevention of displacement of the pad relative to the crawler plate in the running direction of the crawler is realized by engaging the groove d formed in the pad body a with the grouser of the crawler plate, it is not applicable for the crawler plate having the grouser at an appropriate position, such as the intermediate position in the running direction of the crawler plate or for the crawler plate having relatively high grouser, such as for bulldozer crawler plate for dry ground. This limits applicable models of the vehicles.

Furthermore, the conventional crawler pad is formed into a solid block of hard rubber in overall thickness while a metal core insert is provided so that the back side thereof will directly contact with the tread surface of the crawler plate. This clearly requires relatively large amount of hard rubber to result in high cost.

In addition, since the allowable wearing of the pad body is limited to the equal height to the height of the hooking members c, c, the remaining rubber pad after wearing up to the allowable limit has been simply disposed. Since the hard rubber is relatively expensive, disposing of worn pad body is wasteful.

Also, in the prior art, since a reinforcement, such as the metal core, is inserted within the hard rubber, it is difficult to remove the metal core for recycling upon disposing the rubber pad. Furthermore, the presence of the metal core in the disposed pad makes the disposing process difficult.

As set forth above, in the prior art, the crawler pad is mounted on the crawler plate by means of the hooking members c, c at both ends. This requires installation of the hooking members c, c for respective sides of the crawler pads to degrade workability.

SUMMARY OF THE INVENTION

In view of the drawbacks in the prior art, it is an object of the present invention to provide a crawler pad which can be prevented from displacing during traveling of a vehicle without depending upon a grouser on a crawler plate.

Another object of the invention is to provide a crawler pad which can reduce an amount of an elastic material, such as a hard rubber and, as well, an amount of the elastic rubber wasted after wearing.

A further object of the invention is to provide a crawler pad which permits wearing of a substantial part of the elastic material and recycling of a metal core after wearing of the elastic material.

A still further object of the present invention is to provide a crawler pad which can be mounted on the crawler plate with simple operation for improving workability in installation of the crawler pads.

In order to accomplish the above-mentioned and other objects, a crawler pad according to the present invention, generally provided with a fixed hook means integrated with the crawler pad at one end and a detachable hook means which is detachable with respect to the other end of the crawler pad. Also, the present invention provides the crawler pad, in which a fastening member for fastening the detachable hook means which is provided at least one side of the crawler pad is placed so as not to project beyond the end of the hook means.

According to one aspect of the invention, a crawler pad to be mounted on a tread surface of a crawler plate forming a crawler for forming an elastic tread for protecting a road surface, comprises:

an elastic member forming the tread of the crawler pad;
a reinforcement supporting the elastic member;
a fixed hook means integrally formed with the reinforcement for engaging with one edge of the crawler plate;
a detachable hook means detachably secured at the other end of the reinforcement for engaging with the other edge of the crawler plate; and
a fastening means for firmly securing the detachable hook means to the other end of the reinforcement, the fastening means having an outer end placed at an inwardly shifted position relative to the outer end portion of the detachable hook means.

In the preferred construction, a seat position of the detachable hook means to be fitted to the other end of the reinforcement may be shifted inwardly from the position to engagement with the other edge of the crawler plate. Also, a seat position of the detachable hook means to be fitted to the other end of the reinforcement may be shifted inwardly from the end of the elastic member.

Also, it is preferred that a grouser receptacle position may be formed in the reinforcement for engaging with a grouser provided on the tread surface of the crawler plate. The reinforcement may be formed with an engaging portion for engaging with a link mounting bolt for restricting displacement of the crawler pad in a running direction of the crawler.

According to another aspect of the invention, a crawler pad to be mounted on a tread surface of a crawler plate forming a crawler for forming an elastic tread for protecting a road surface, comprises:
- an elastic member forming the tread of the crawler pad;
- a reinforcement supporting the elastic member;
- a fixed hook means integrally formed with the reinforcement for engaging with one edge of the crawler plate;
- a detachable hook means detachably secured at the other end of the reinforcement for engaging with the other edge of the crawler plate; and
- an engaging means provided in the reinforcement for engaging with a link mounting bolt projecting from the tread surface of the crawler plate for restricting displacement of the crawler pad in a running direction of the crawler.

In this case, the crawler pad may further comprise a fastening means for firmly securing the detachable hook to the other end of the reinforcement, the fastening means having an outer end placed at an inwardly shifted position relative to the outer end portion of the detachable hook means.

According to a further aspect of the invention, a crawler pad to be mounted on a tread surface of a crawler plate forming a crawler and having a grouser on the tread surface, for forming an elastic tread for protecting a road surface, comprises:
- an elastic member forming the tread of the crawler pad;
- a reinforcement supporting the elastic member;
- an engaging member extending from the reinforcement for contacting with the tread surface of the crawler plate and engaging with the grouser;
- a fixed hook means integrally formed with the reinforcement for engaging with one edge of the crawler plate; and
- a detachable hook means detachably secured at the other end of the reinforcement for engaging with the other edge of the crawler plate.

In these cases, a leg member to contact with the tread surface of the crawler plate may be extended from the back side of the reinforcement. Also, the fastening direction for securing the detachable hook means to the reinforcement may be the longitudinal direction of the crawler plate. In the alternative, the fastening direction for securing the detachable hook means to the reinforcement is the thicknesswise direction of the crawler plate.

The tread surface of the elastic member may be formed into an uneven profile for better traction. In the preferred construction, a frame is extended from longitudinal both sides of the reinforcement to bury within the elastic member.

The elastic member may comprise a major portion formed of a relatively softer material and a plurality of harder portions formed of a relatively harder material. It is also possible that a plurality of spikes are implanted in the elastic member.

The engaging portion or means for engaging with the link mounting bolt may comprise an engaging hole. Alternatively, the engaging portion for engaging with the link mounting bolt may comprise a contact plate contacting with the link mounting bolt in the running direction of the crawler. In the further alternative, the engaging portion engages with a plurality of link mounting bolts and the engaging portion comprises plate members externally contacting with a plurality of the link mounting bolts. Also, it is possible that the engaging portion engages with a plurality of link mounting bolts and the engaging portion comprises plate members arranged for internally contacting with respective link mounting bolts. In the further alternative, the engaging portion comprises a pipe member engaging with the link mounting bolt.

In the preferred construction, the reinforcement may comprise a frame like base, on which the elastic member is rigidly secured. Practically, the reinforcement may comprise a metal core and an engaging member rigidly fixed to the metal core or an engaging member integrally formed with the metal core. Preferably, the a part of the detachable hook means is buried within the elastic member. The reinforcement may be provided with an engaging member for engaging with a grouser formed on the tread surface of the crawler plate.

According to a still further aspect of the invention, a crawler pad to be mounted on a tread surface of a crawler plate forming a crawler and having a grouser on the tread surface, for forming an elastic tread for protecting a road surface, comprises:
- an elastic member forming the tread of the crawler pad, the elastic member engaging with the grouser and contacting with tread surface of the crawler plate;
- a reinforcement supporting the elastic member, the reinforcement comprising a flat plate portion extending in parallel to the tread surface of the crawler plate and side plates backwardly extending from both sides of the flat plate portion for forming a backwardly opened box shaped configuration, the box shaped reinforcement being fitted with the elastic member on both of the surface side and back side thereof;
- a fixed hook means integrally formed with the reinforcement through a stepped portion for engaging with one edge of the crawler plate;
- a detachable hook means formed with stepped configuration and detachably secured at the other end of the reinforcement for engaging with the other edge of the crawler plate.

In this case, it is preferred that the ends of the side plates are rigidly connected to the fixed hook means. Also, the fixed hook means and the detachable hook means may be formed with a receptacle for receiving the grouser of the crawler plate.

In the preferred construction, the elastic members are terminated at longitudinal positioned slightly inside of the longitudinal ends of the flat plate portion of the crawler plate. Also, the width of the elastic member at the surface side is selected to position both ends in the width direction at inside of the both widthwise edges of the crawler plate.

According to a yet further aspect of the invention, a crawler pad to be mounted on a tread surface of a crawler plate forming a crawler for forming an elastic tread for protecting a road surface, comprises:
- an elastic member forming the tread of the crawler pad;
- a reinforcement supporting the elastic member;
- a fixed hook means integrally formed with the reinforcement for engaging with one edge of the crawler plate;

a detachable hook means detachably secured at the other end of the reinforcement for engaging with the other edge of the crawler plate;

a fastening means for firmly securing the detachable hook means to the other end of the reinforcement, the fastening means having an outer end placed at an inwardly shifted position relative to the outer end portion of the detachable hook means; and a fixing means for fixing the reinforcement to the crawler plate for restricting displacement of the crawler pad relative to the crawler panel.

Preferably, the fixing means comprises a cut-out formed in one of the crawler plate and the reinforcement and an engaging tongue engaging with the cut-out and formed in the other of the crawler plate and the reinforcement. When the crawler panel has a grouser extending along one longitudinal edge thereof, the cut-out is formed through the grouser. In the alternative, the fixing means comprises bolts extending through both of the crawler panel and the reinforcement. When the crawler panel has a grouser extending along one longitudinal edge and the bolts extends through the grouser and the reinforcement.

According to a yet further aspect, a crawler pad to be mounted on a tread surface of a crawler plate forming a crawler for forming an elastic tread for protecting a road surface, comprises:

a plurality of pad segments separated to each other and each comprising an elastic member forming the tread of the crawler pad, and a reinforcement supporting the elastic member, the pad segments being mounted on the crawler plate in alignment for forming the crawler pad as unitary assembled;

a detachable hook means detachably secured at least one end of the reinforcement for engaging with the corresponding longitudinal end edge of the crawler plate;

a fastening means for firmly securing the detachable hook means to the end of the reinforcement, the fastening means having an outer end placed at an inwardly shifted position relative to the outer end portion of the detachable hook means.

Preferably, the crawler pad further comprises at least one elongated member extending through the pad segments aligned on the crawler plate to fix the pad segments in assembled fashion. In this case, the detachable hook means are provided for engagement with both longitudinal ends of the crawler plate and the elongated member extends between the detachable hook means at both longitudinal ends.

In the further preferred construction, the plurality of pad segments includes a first pad segment having a first elastic member made of a harder elastic material and a second pad segment having a second elastic member made of a softer elastic material. In practice, the first pad segments are provided at both longitudinal ends and the second segment is provided at the intermediate position between the first segments.

According to a still further aspect of the invention, a crawler pad to be mounted on a tread surface of a crawler plate forming a crawler for forming an elastic tread for protecting a road surface, comprises:

an elastic member forming the tread of the crawler pad;

a reinforcement supporting the elastic member; and a fastening means for firmly securing the reinforcement to the crawler plate, the fastening means extends through the crawler plate.

According to a still further aspect of the invention, a crawler pad to be mounted on a tread surface of a crawler plate forming a crawler for forming an elastic tread for protecting a road surface, the crawler plate being adapted to a wet or muddy ground and having a substantially triangular cross-section with a peak positioned at substantially at the lateral center, comprises:

a plurality of pad segments separated in the longitudinal direction of the crawler panel, each including an elastic member forming the tread of the crawler pad and a reinforcement supporting the elastic member and having cross-sectional configuration substantially conforming with the cross sectional configuration of the crawler plate;

hook means secured at the ends of the reinforcement for engaging with the edges of the crawler plate; and a fastening means for firmly securing mutually adjacent pad segments.

According to a yet further aspect of the invention, a crawler pad to be mounted on a tread surface of a crawler plate forming a crawler for forming an elastic tread for protecting a road surface, the crawler plate being adapted to a wet or muddy ground and having a substantially triangular cross-section with a peak positioned at substantially at the lateral center, comprises:

a plurality of pad segments separated in the longitudinal direction of the crawler panel and at least including a pair of end segments to be positioned at both ends of the crawler pad and an intermediate segments disposed between the end segments, at least the intermediate segments including an elastic member forming the tread of the crawler pad and a reinforcement supporting the elastic member and having cross-sectional configuration substantially conforming with the cross sectional configuration of the crawler plate, and the end segments at least including the reinforcement;

hook means secured at the ends of the reinforcement of the end segments for engaging with the edges of the crawler plate; and a fastening means for firmly securing mutually adjacent pad segments.

BRIEF DESCRIPTION OF THE DRAWINGS

The present invention will be understood more fully from the detailed description given herebelow and from the accompanying drawings of the preferred embodiments of the invention, which, however, should not be taken to be limitative to the invention, but are for explanation and understanding only.

In the drawings:

FIG. 18A is a bottom view of the crawler panel to as viewed in FIG. 17;

FIG. 18B is a cross section taken along line J—J of FIG. 18A;

DESCRIPTION OF THE PREFERRED EMBODIMENT

The present invention will be discussed in detailed in terms of the preferred embodiments with reference to the accompanying drawings.

Figure 1:
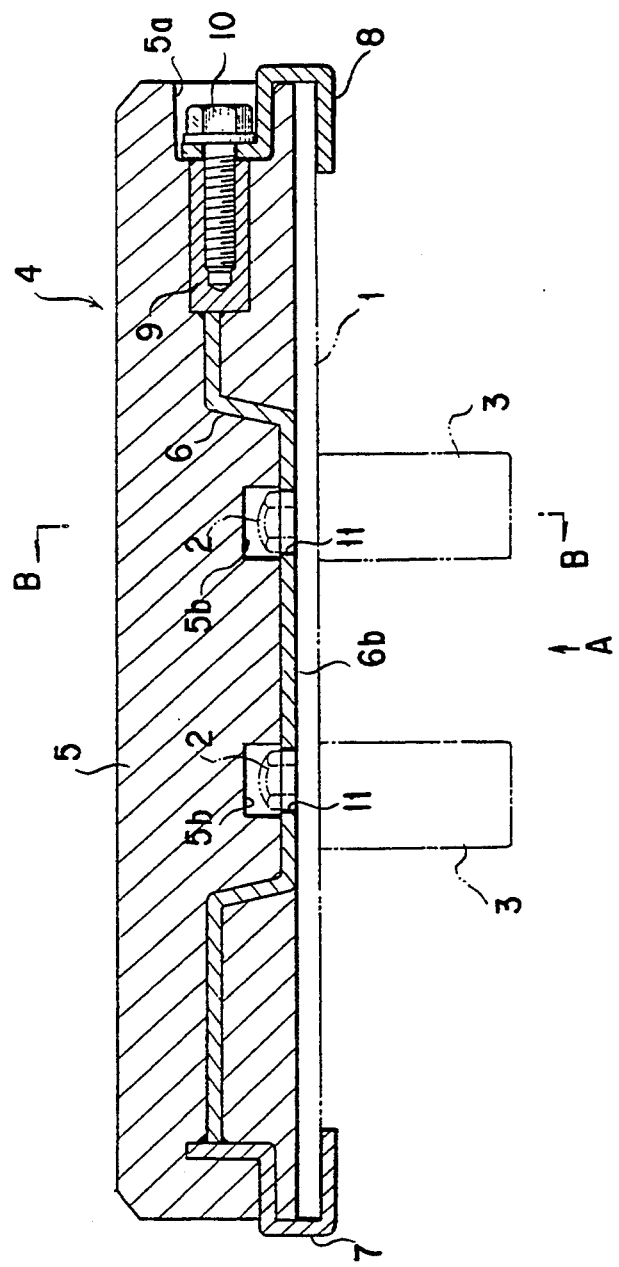
FIG. 1 is a section of the first embodiment of a crawler pad according to the present invention.
Figure 2:
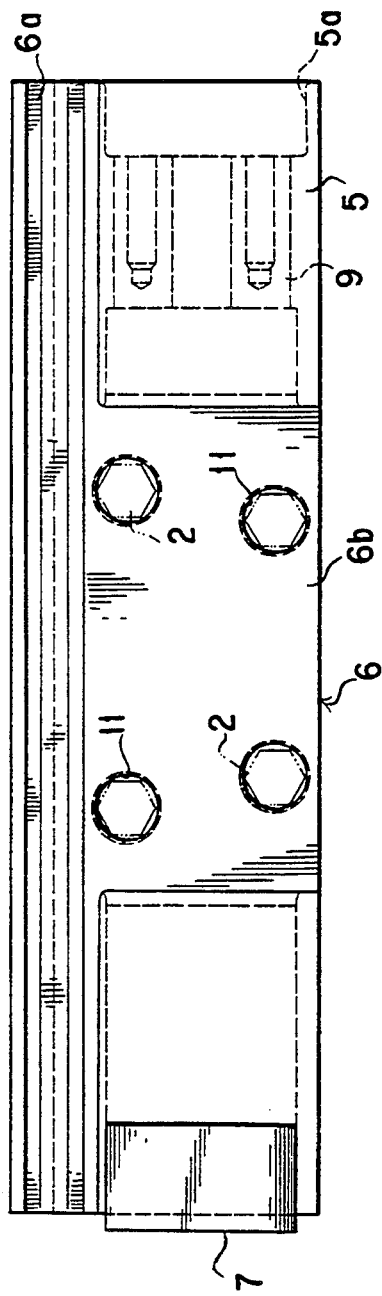
FIG. 2 is a view of the first embodiment of the crawler pad as viewed along the arrow A in FIG. 1.

FIG. 1 is a section illustrating the first embodiment of a crawler pad according to the present invention. In the drawings, the reference numeral 1 denotes a crawler plate of a crawler of a bulldozer. For the purpose of illustration, the crawler plate 1 in FIG. 1 is for a dray ground. A plurality of crawler plates 1 are connected via a track link 3 coupled by means of four link mounting bolts 2 in order to form an endless crawler.

The reference numeral 4 denotes the first embodiment of a crawler pad according to the present invention, which is detachably mounted on the tread surface of each of the crawler plates 1. The crawler pad 4 includes an elastic member 5 forming new tread, a metal core 6 buried in the elastic member 5 and serving as a reinforcement member, a fixed hooking member 7 which is rigidly secured on one end of the metal core 6 and a detachable hooking member 8 detachably secured on the other end of the metal core 6.

The crawler pad 4 is mounted on the crawler plate 1 by engaging the fixed hooking member 7 and the detachable hooking member 8 to both edges of the crawler plate. The detachable hooking member 8 is fixedly secured on the other end of the metal core 6 by means of a bolt 10 as a fastening member threadingly engaging with a nut member 9 which is rigidly secured on the other end of the metal core 6. The mounting portion of the detachable hooking member 8 to made with the nut member 9 is bent inwardly from the hook portion to engage with the edge crawler plate 1 so that the head of the bolt 10 is placed inside of the hook portion of the detachable hooking member 8. It should be noted that, in the alternative embodiment, a bolt may be rigidly secured on the other end of the metal core 6 and the detachable hooking member 8 is secured on the other end of the metal core 6 by means of a nut. The elastic member 5 is formed with a recess 5a for receiving the head of the bolt 10 or the nut therein so that the bolt head or nut is placed inside of the end surface of the elastic member 5. Naturally, the inwardly bent mounting portion of the detachable hooking member 8 is placed inside of the end face of the elastic member 5.

Figure 3:
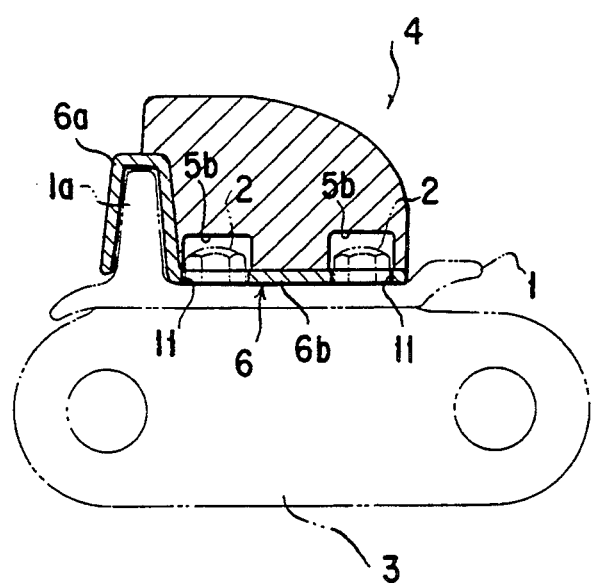
FIG. 3 is a cross section taken along line B—B of FIG. 1.

On the other hand, positioning of the crawler pad 4 relative to the crawler plate 1 in the running direction of the crawler plate 1 is achieved by means of the metal core 6. Namely, the cross section of the metal core 6 in the running direction of the crawler plate 1 is as illustrated in FIG. 3. In the shown construction, the metal core 6 is formed with a grouser receptacle portion 6a to engage with a projecting grouser 1a of the crawler plate 1. On the other hand, at the longitudinal intermediate portion 6b, the metal core 6 is bent to extend along the bottom surface of the elastic member 5, as shown in FIG. 1. Four engaging holes 11 are formed through the bent intermediate portion 6b of the metal core 6 for receiving link mounting bolts 2. Correspondingly, the elastic member 5 is formed with recesses 5b at the position corresponding to the engaging holes 11 to loosely receive therein the head of the link mounting bolts 2.

In the foregoing construction, for mounting the crawler pad 4 onto the crawler plate 1, the fixed hooking member 7 is engaged to one edge of the crawler plate 1 and the grouser receptacle portion 6a is engaged to the grouser 1a of the crawler plate 1 while the detachable hooking member 8 is held detached from the other end of the metal core 6. After situating the crawler pad 4 along the crawler plate 1, the detachable hooking member 8 is secured on the other end of the metal core 6 engaging with the other edge of the crawler plate 1.

Through this process, the crawler pad 4 is secured with preventing displacement in the width direction by engagement of both hooking members 7 and 8 onto both edges of the crawler plate 1 and by engagement of the engaging holes 11 with the link mounting bolts 2, and with preventing displacement in the running direction of the crawler by engagement between the grouser 1a of the crawler plate 1 and the grouser receptacle portion 6a of the metal core 6 and by engagement between the engaging holes 11 of the metal core 6 and the link mounting bolts 2. Therefore, the crawler pad 4 is firmly held in place on the crawler plate 1. Therefore, the crawler pad 4 can be mounted on the crawler plate 1 without causing displacement in neither directions. At this condition, the top surface of the elastic member 5 of the crawler pad 4 forms the new tread to contact with the road surface so as not to damage the road surface.

In the shown construction, since the head of the bolt 10 is positioned inside of hooking portion of the detachable hooking member to engage with the other end of the crawler plate, of the outer end of the detachable hooking member and of the outer end surface of the elastic member 5, it may not project from the side end of the crawler pad 4. Therefore, possibility that the bolt head may contact with bump or other matters on the road to cause damaging thereof, can be successfully eliminated. This provides substantial gain in safety in mounting of the crawler pad 4.

Figure 4:
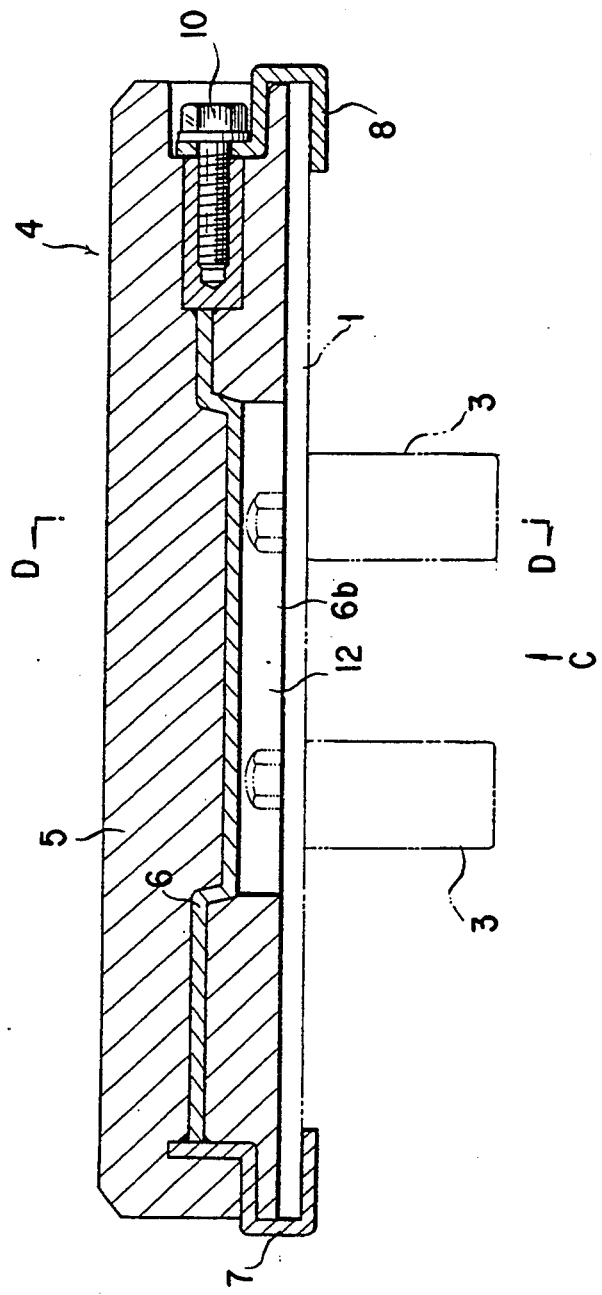
FIG. 4 is section of the second embodiment of the crawler pad according to the present invention.

It should be noted that, in the foregoing first embodiment, the crawler pad 4 is provided with the grouser receptacle portion 6a to engagement with the grouser 1a of the crawler plate 1 for suppressing displacement of the crawler pad 4 in the running direction of the crawler relative to the crawler plate, the grouser receptacle portion 6a is not essential in implementation of the present invention and can be neglected. FIG. 4 and subsequent figures illustrate embodiments, in which the grouser receptacle portion 6a is neglected.

Figure 5:
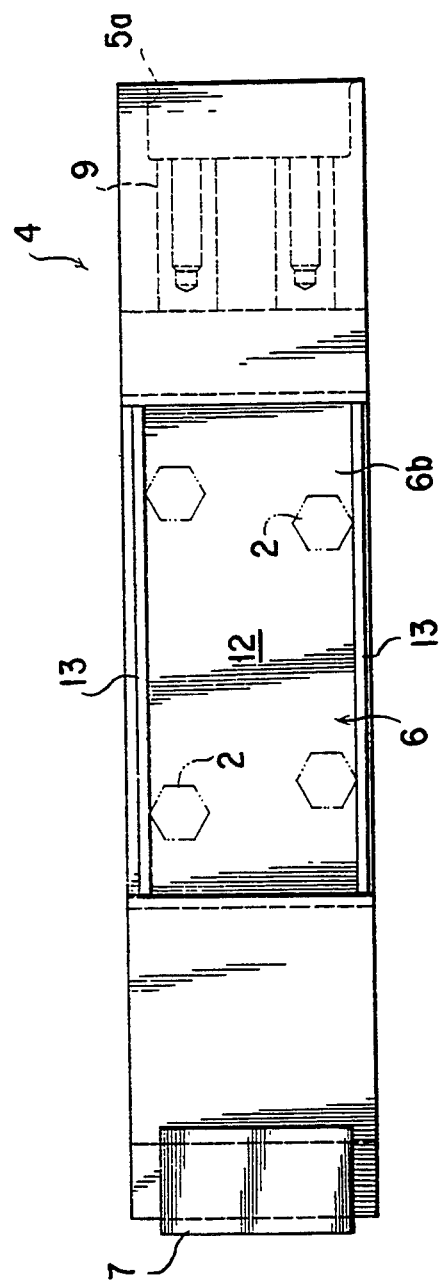
FIG. 5 is a view of the second embodiment of FIG. 4 as viewed along the arrow c in FIG. 4.
Figure 6:
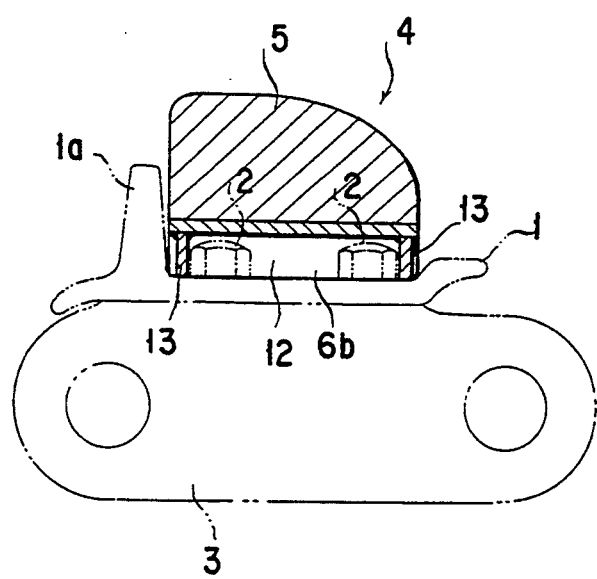
FIG. 6 is a cross section taken along line D—D of FIG. 4.

FIGS. 4, 5 and 6 illustrate the second embodiment of the crawler pad according to the invention. It should be noted that like reference numerals to those in the former embodiment will represent the like elements. In the shown embodiment, the width of the crawler pad 4 is selected to correspond to a plane portion of the crawler plate 1 excluding the grouser 1a. Also., the intermediate portion 6b is shifted toward the top end from the surface mating with the crawler plate 1 so as to define therebetween a clearance which is slightly higher than the height of the head of the link mounting bolts 2. From the front and rear edges of the intermediate portion 6b, contact plates 13, 13 are extended to contact with the heads of the link mounting bolts 2 in the running direction of the crawler, as best shown in FIG. 5.

With this construction, the shown embodiment can restrict displacement of the crawler pad 4 relative to the crawler plate 1 in the running direction of the crawler by contacting the heads of the link mounting bolts 2 and the contact plates 13, 13.

Figure 7:
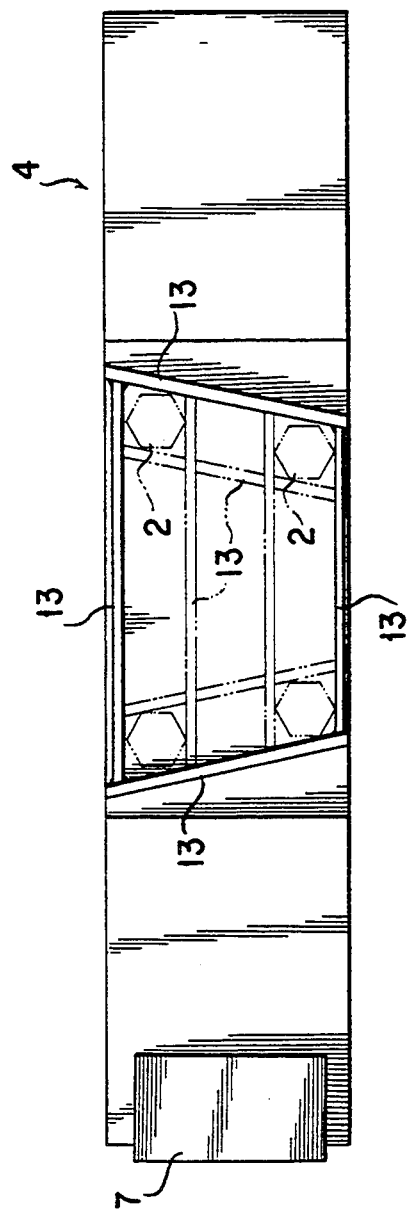
FIG. 7 is a bottom view showing a engaging portion with a link mounting bolt in the third embodiment of the crawler pad of the invention.

FIG. 7 shows the third embodiment of the crawler pad according to the present invention, which also employs the contact plates 13. In the shown embodiment, the contact plates 13 are provided to externally surrounds the heads of the link mounting bolts 2.

With the shown construction, not only the restriction of displacement of the crawler pad relative to the crawler plate in the running direction of the crawler, but also the restriction of the displacement in the width direction can be achieved by the engagement of the contact plates 13 and the head of the four link mounting bolts 2.

It should be noted that the contact plates 13 may alternatively arranged to internally contact with four link mounting bolts 2, as illustrated by phantom line in FIG. 7.

Figure 8:
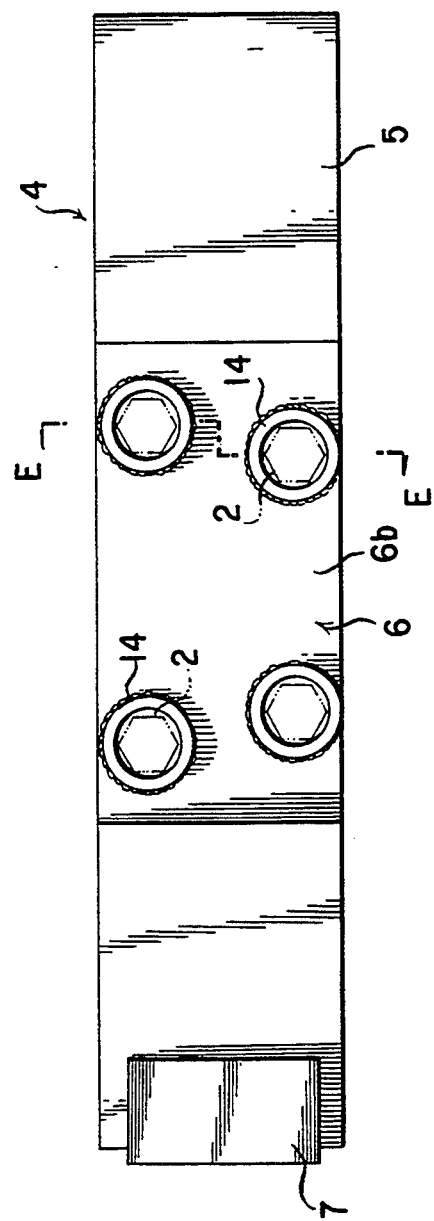
FIG. 8 is a bottom view showing a engaging portion with a link mounting bolt in the fourth embodiment of the crawler pad of the invention.
Figure 9:
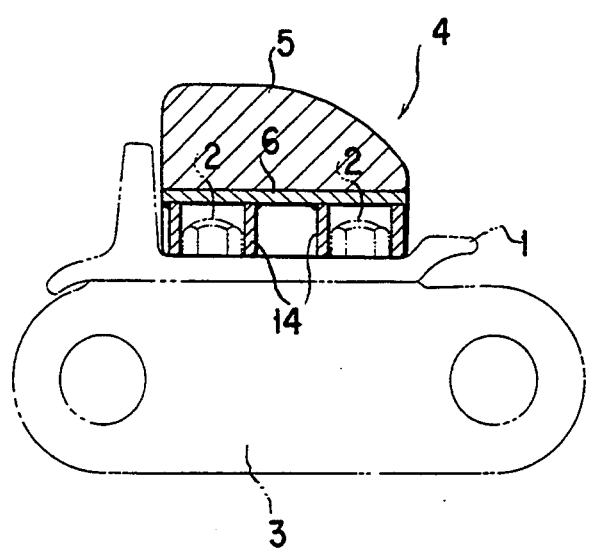
FIG. 9 is a cross section taken along line E—E of FIG. 8.

FIGS. 8 and 9 show the fourth embodiment of the crawler pad according to the invention. In the shown embodiment, pipes 14 are rigidly secured on the metal core 6 in place of the contact plate 13 for contacting with the heads of the link mounting bolts 2.

Figure 10:
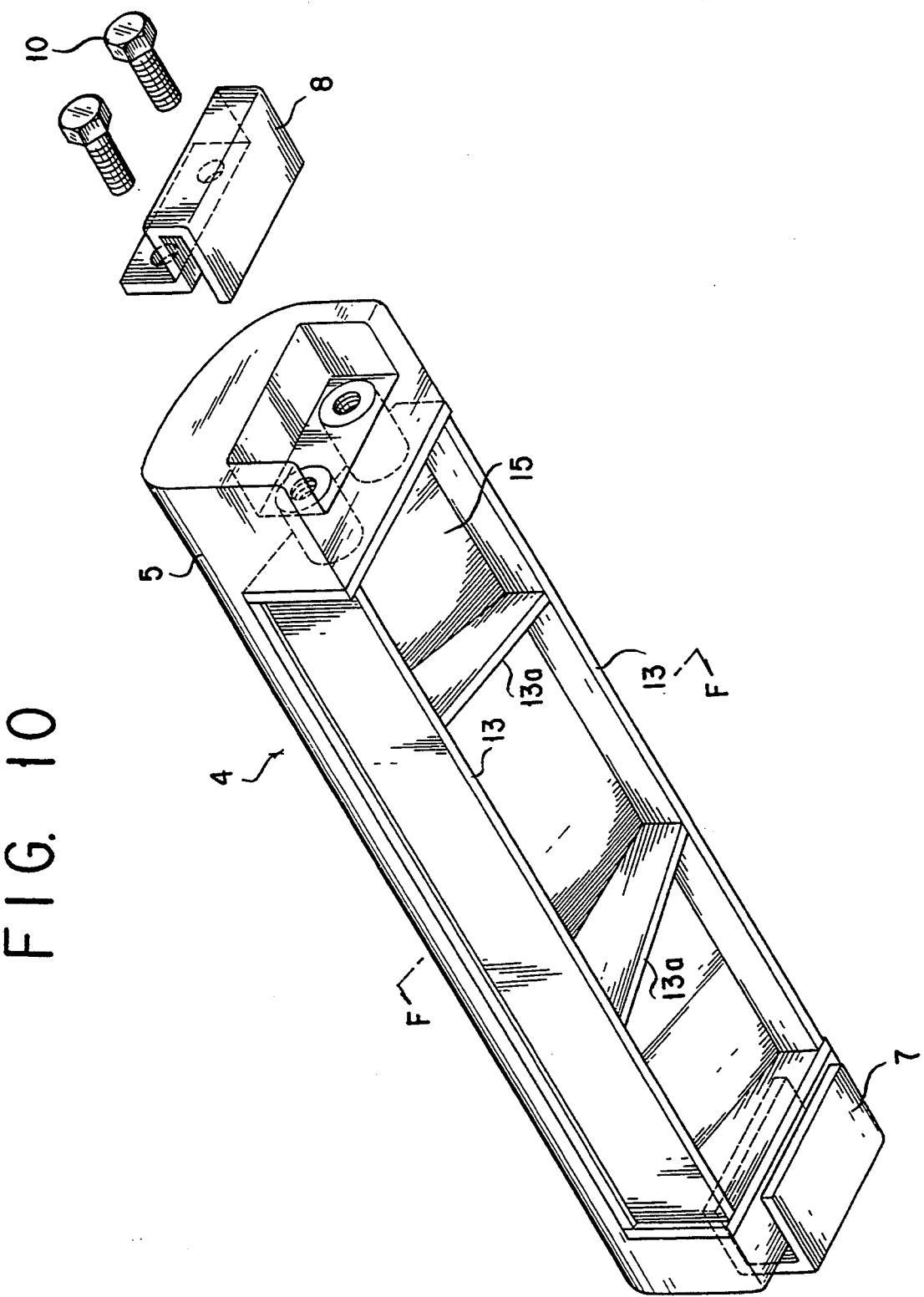
FIG. 10 is a perspective of the fifth embodiment of the crawler pad of the invention.
Figure 11:
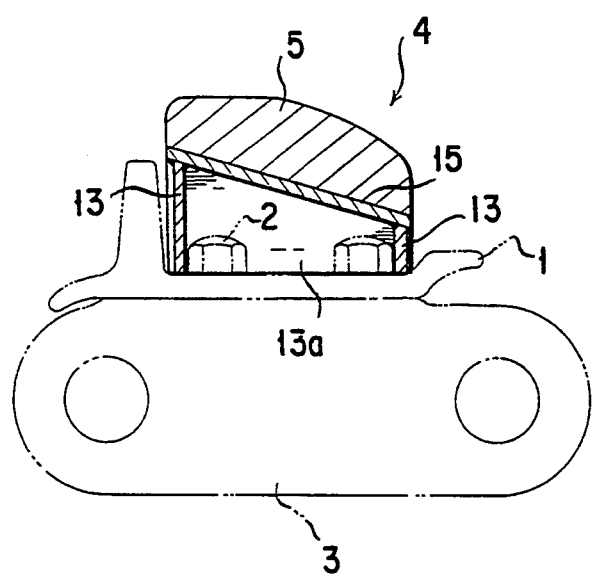
FIG. 11 is a cross section taken along line F—F of FIG. 10.

FIGS. 10 and 11 show fifth embodiment of the crawler pad according to the present invention. In the shown embodiment, the metal core is formed into a frame like construction to form a frame base 15. On the outer surface of the frame base 15, the elastic member 5 forming the tread is rigidly secured by way of baking or so forth. The fixed hooking member 7 is rigidly secured on one end of the frame base 15. The detachable hooking member 8 is detachably secured on the other end of the frame base 15. From both edges in the width direction, contact plates 13 to contact with the heads of the link mounting bolts 2 are extended. Also, at the intermediate portion of the frame base 15, the contact plats 13a are extended transversely to contact with the heads of the link mounting bolts 2.

In the shown construction, the restriction of displacement of the crawler pad 4 in the traveling or width direction is achieved by the contact plates 13, and the restriction of the displacement of the crawler pad in the longitudinal direction is achieved by the contact plates 13a as well as the both hooking members 7 and 8.

With the shown embodiment, the amount of the expensive elastic material, such as a hard rubber, to form the elastic member can be reduced to result in lowering of the production cost.

Figure 12:
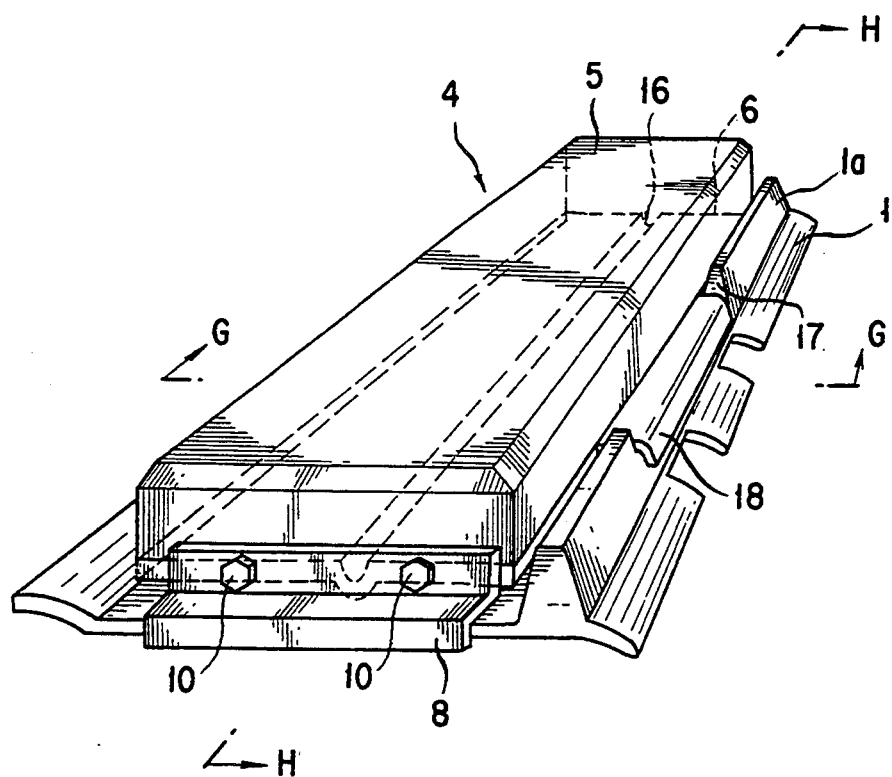
FIG. 12 is a perspective view of the sixth embodiment of the crawler pad of the present invention.
Figure 13:
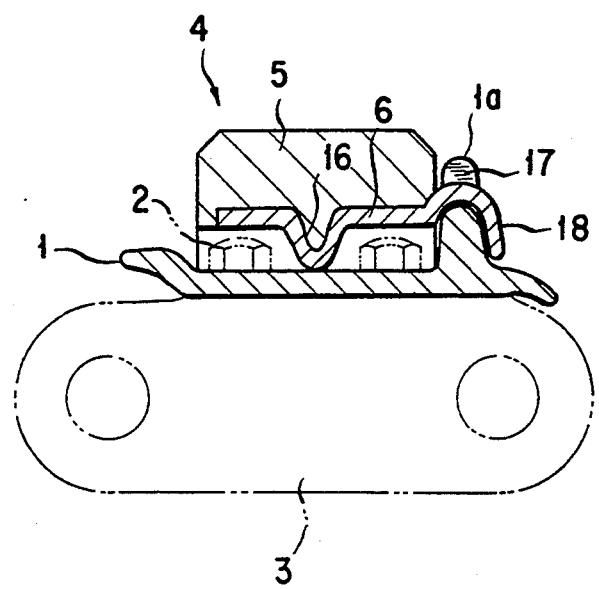
FIG. 13 is a cross section taken along line G—G of FIG. 12.
Figure 14:
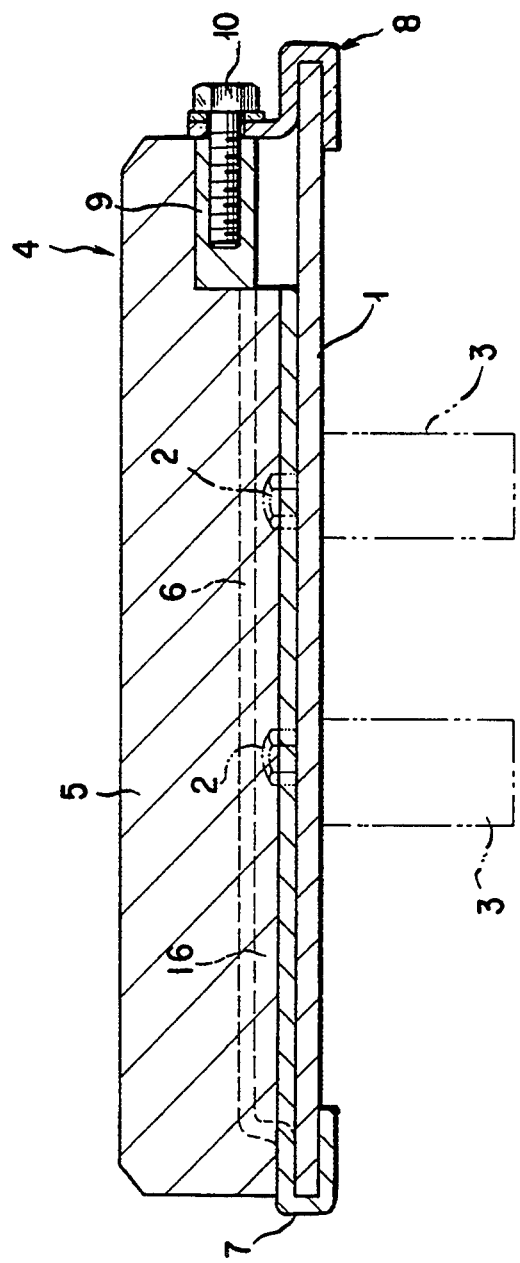
FIG. 14 is a longitudinal section taken along line H—H of FIG. 12.

FIGS. 12 to 14 show the sixth embodiment of the crawler pad according to the present invention. In the shown embodiment, a downwardly projecting rib 16 is formed in the core metal 6. The rib 16 extends longitudinal direction of the crawler plate 1 and laterally positioned between the link mounting bolts 2. In addition, the core metal 6 is provided with a hooking tongue 18 which engages with a cut-out recess 17 formed in the grouser 1a.

The rib 14 serves as a reinforcement for the metal core 6 against bending stress and also serves as a spacer for assuring prevention of the head of the link mounting bolts 2 from interfering with the metal core 6. On the other hand, the hooking tongue 18 serves, in cooperation with the cut-out recess 17, to aid restriction of displacement of the metal core 6 relative to the crawler plate 1.

Figure 15:
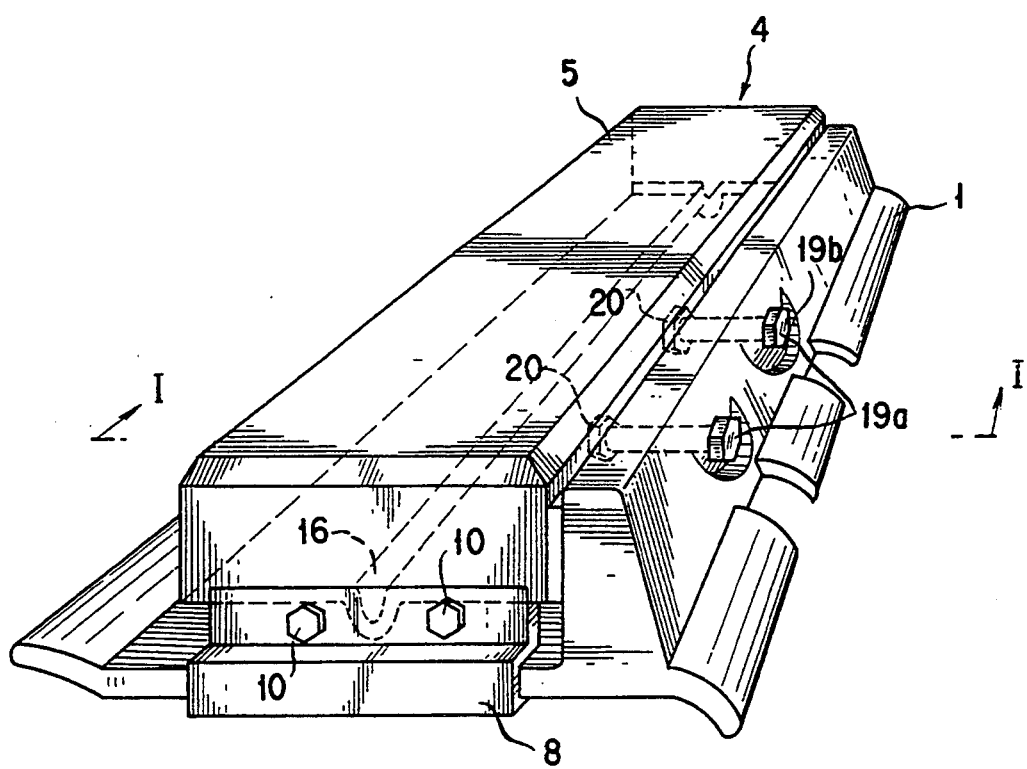
FIG. 15 is a perspective view of the sixth embodiment of the crawler pad of the present invention.
Figure 16:
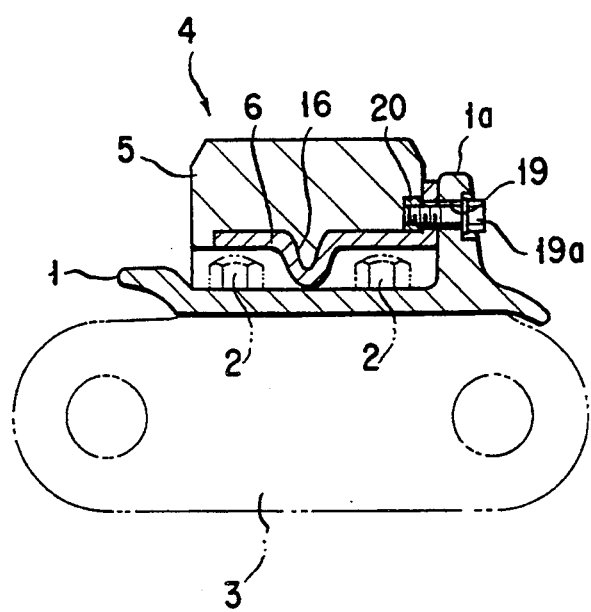
FIG. 16 is a cross section taken along line I—I of FIG. 15.

FIGS. 15 and 16 are modification of the foregoing sixth embodiment of the crawler pad according to the present invention. In the shown embodiment, bolt holes 19 are formed through the grouser 1a of the crawler panel 1. Nuts 20 are rigidly secured on the metal core 6 at the positions corresponding to the bolt holes 19 so that they may be placed in alignment with the latter when the crawler pad is mounted on the crawler panel 1 at the right position. Bolts 19a extend through respective bolt holes 19 for engaging with the nuts 20. The heads of the bolts 19a are positioned within arc shaped recess 19b which have bottoms extending substantially in perpendicular to the general plane of the crawler panel 1 and outer edges extending in oblique to the bottom, as can be clear from FIG. 15.

As can be appreciated, the bolt-and-nut engagement employed in the shown embodiment can be a replacement with the engagement between the hooking tongue and the cut-out recess in the former embodiment and thus serves to restrict movement or displacement of the core metal 6 relative to the crawler panel 1.

Figure 17:
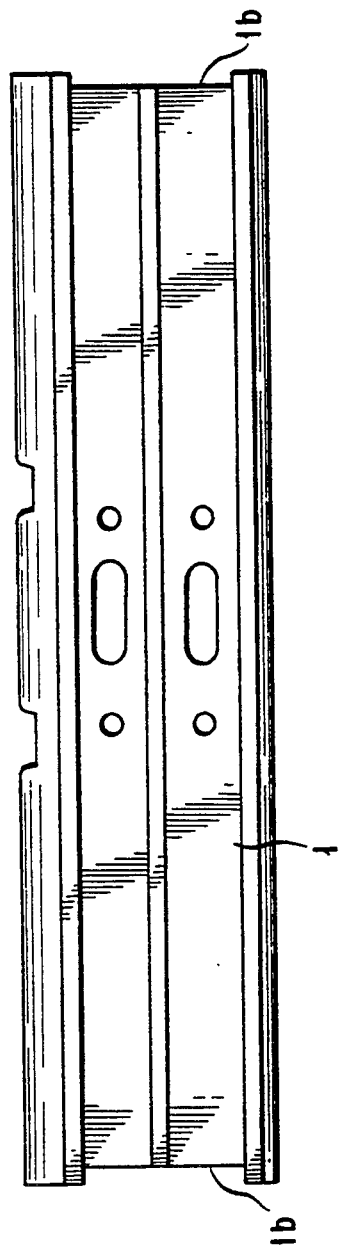
FIG. 17 is a plan view of the crawler panel to be associated with the seventh embodiment of the crawler pad according to the invention.

FIGS. 17 and 18A and 18B show a crawler panel to be associated with a seventh embodiment of the crawler pad according to the invention. In the shown crawler panel, cut-out recesses 1b are formed at both longitudinal ends of the crawler panel 1. The depth of the cut-out recess 1b should be greater than or equal to a dimension of the thickness of the hooking member 7 and 8, so that the hooking member 7 and the assembly of the hooking member 8 will not project from the longitudinal ends of the assembly of the crawler panel 1 and the crawler pad as assembled. In this embodiment, the longitudinal length of the metal core 6 is short of the sum of the depths of both cut-out recesses 1b.

In addition, thinner and deeper recesses 1c are formed at both longitudinal ends of the crawler panel 1. Therefore, the cut-out recesses 1b are adapted to accommodate the portion of each of the hooking members 7 and 8 mating with the longitudinal end surface thereof. The cut-out recesses 1c are designed to accommodate the hooking portions of the hooking members 7 and 8.

With the construction set forth above, the assembly of the crawler panel 1 and the crawler pad 4 will have nothing projecting from the general surfaces thereof. In addition, the cut-out recesses 1b and 1c accommodating the portions of the hooking members may serve to restrict displacement of the crawler pad 4 relative to the crawler panel 1.

The shown construction of the crawler pad is especially suitable for the crawler panel having no grouser.

Figure 19:
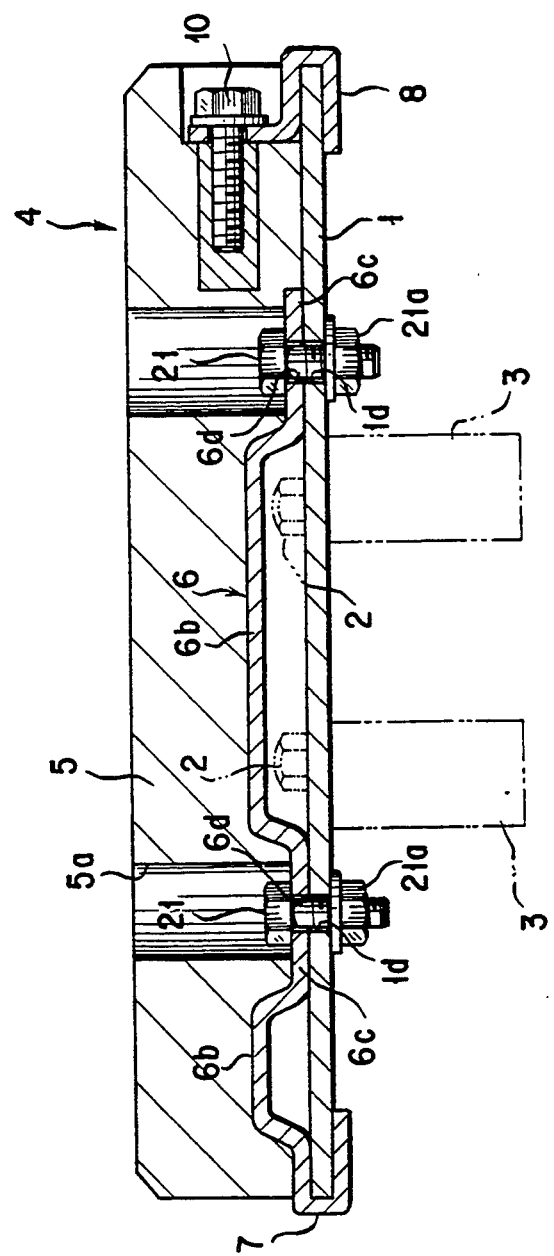
FIG. 19 is a section of the eighth embodiment of the crawler panel according to the invention.
Figure 20:
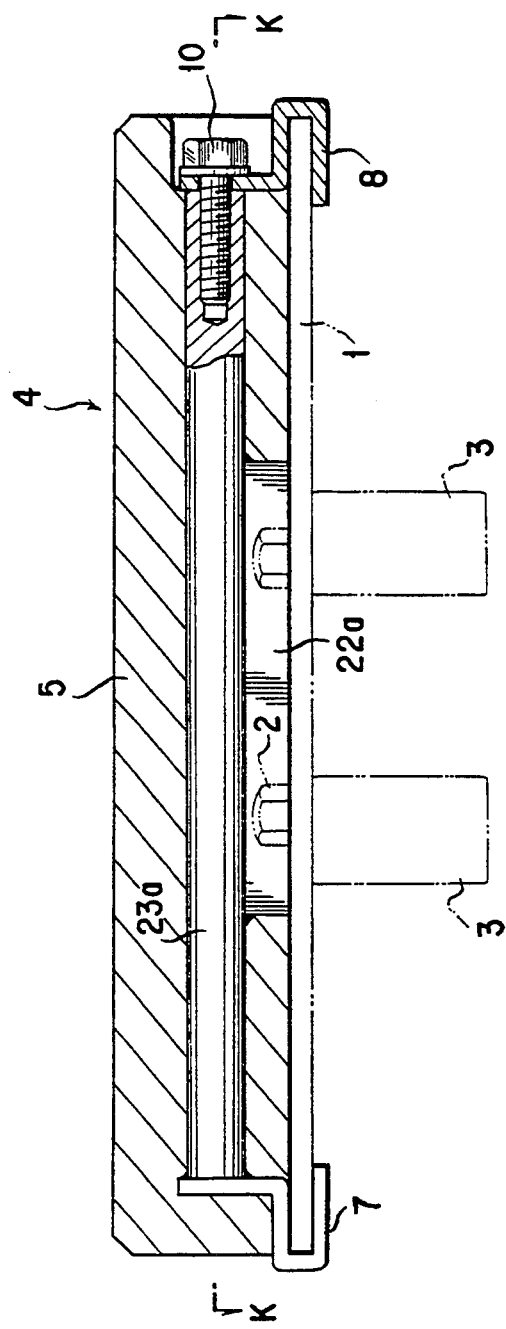
FIG. 20 is a section showing a construction, in which an engaging member engaging with a link mounting bolt is rigidly secured to a reinforcement member of the ninth embodiment of the crawler pad according to the invention.
Figure 21:
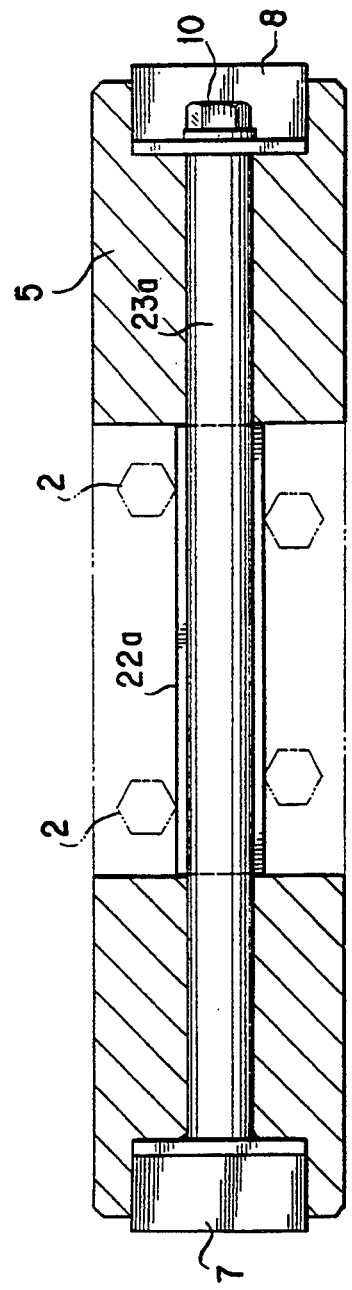
FIG. 21 is a section as viewed along the arrow K of FIG. 20.
Figure 22:
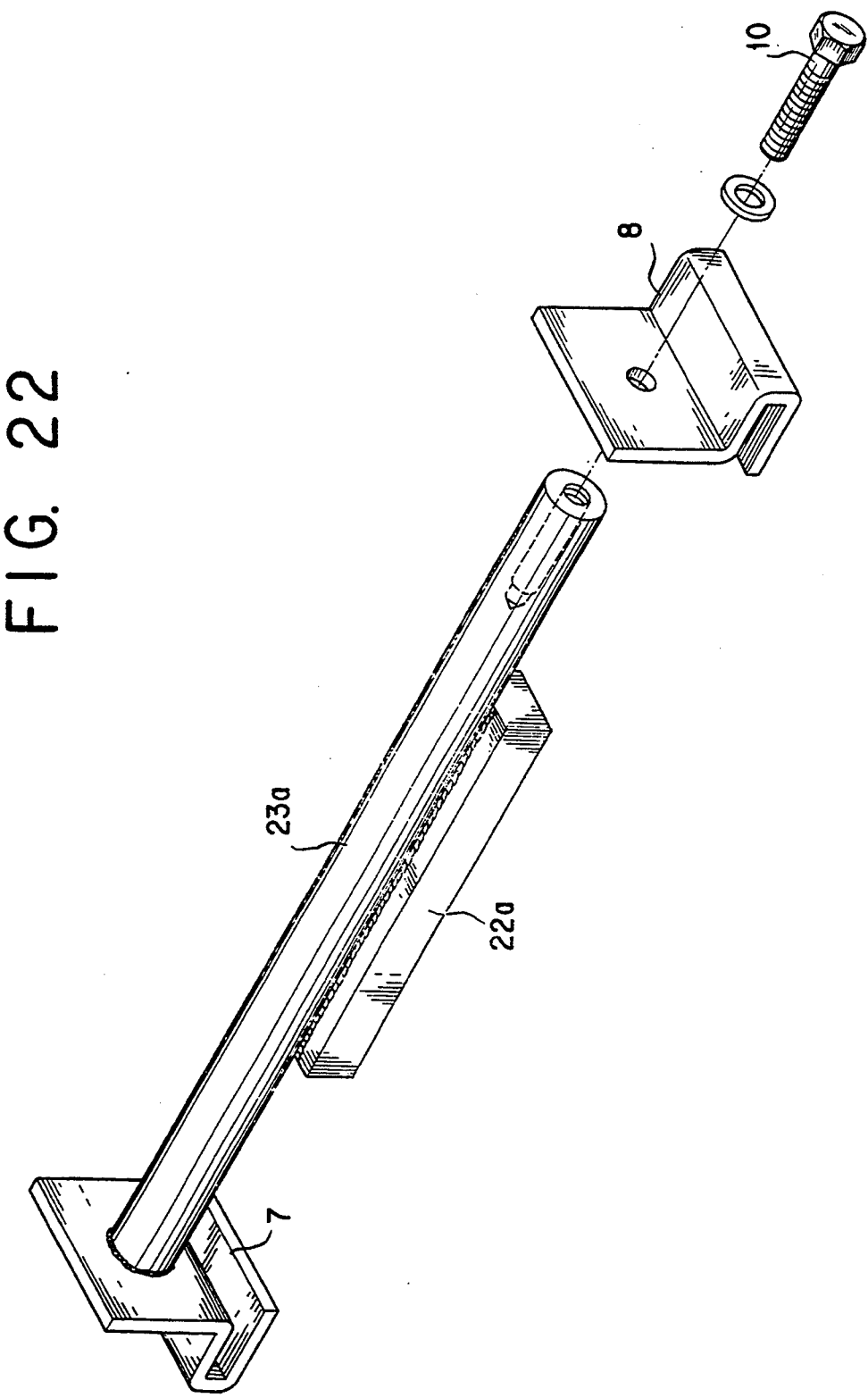
FIG. 22 is an exploded perspective view showing the reinforcement member employed in the tenth embodiment of the crawler pad according to the invention.
Figure 23:
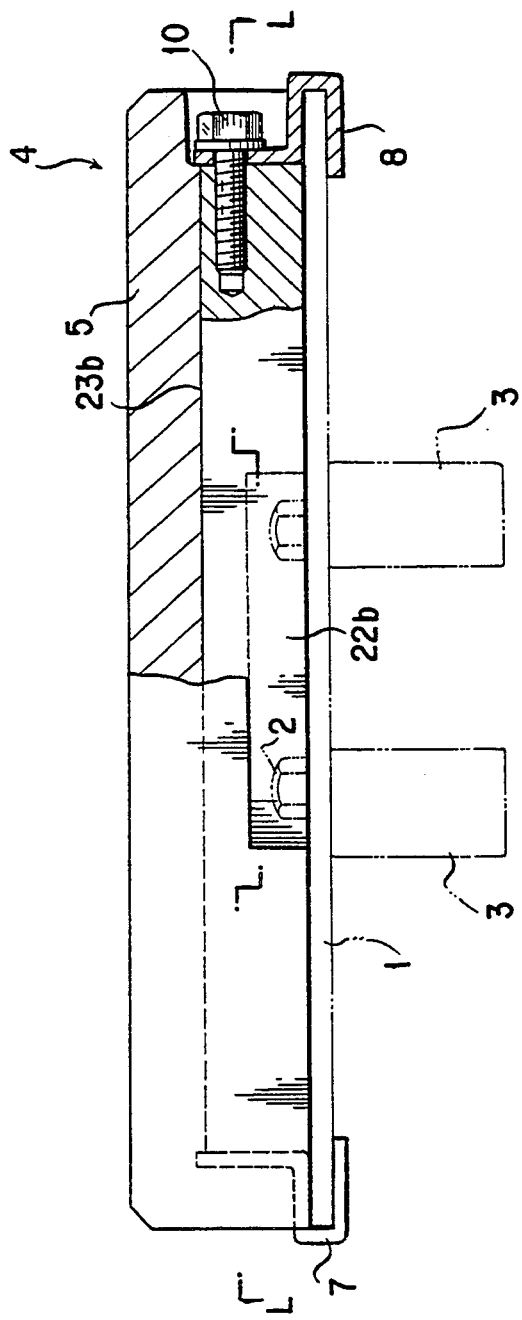
FIG. 23 is a partially sectioned construction, in which the engaging member engaging with the link mounting bolt is formed integrally with the reinforcement member of the seventh embodiment of the scrawler pad according to the invention.
Figure 24:
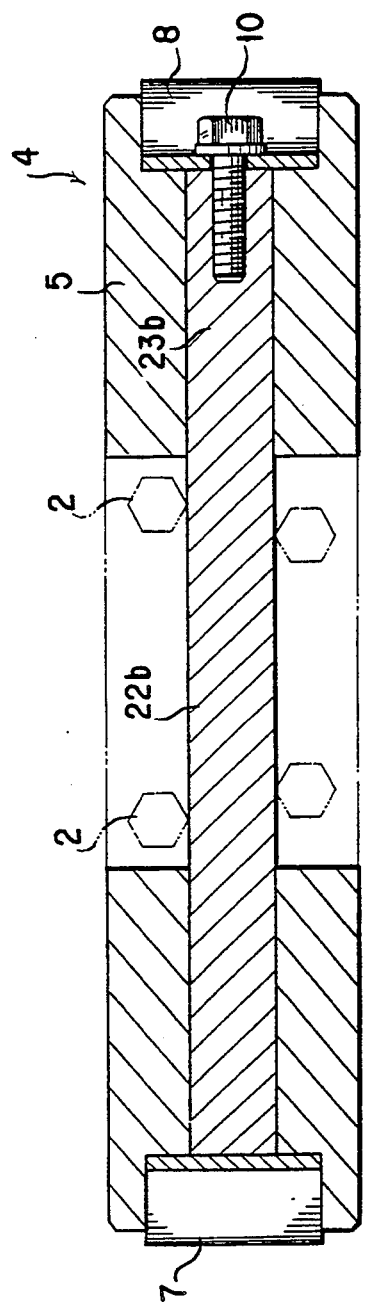
FIG. 24 is a section as viewed along the arrow line L—L of FIG. 23.
Figure 25:
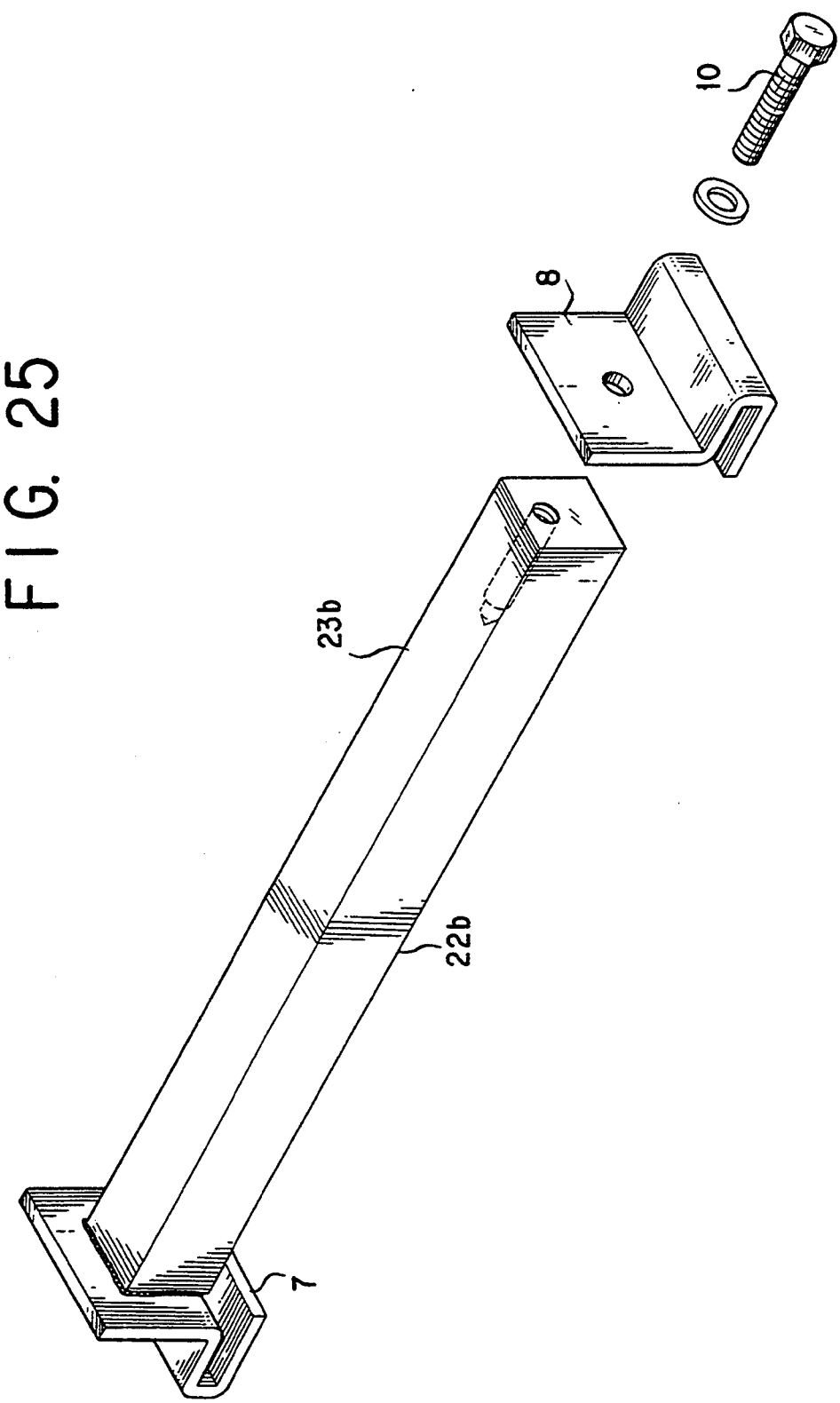
FIG. 25 is an exploded perspective view of the reinforcement member employed in the tenth embodiment of the crawler pad according to the invention.

FIG. 19 shows an eighth embodiment of the crawler pad according to the present invention. In the shown embodiment, the core metal 6 is terminated at the shorter longitudinal length than the crawler panel 1. The core metal 6 has the longitudinal end forming the fixed hooking member 7. The core metal 6 has higher position portions 6b positioned in spaced apart relationship with the surface of the crawler panel 1, lower position portions 6c mating with the crawler panel and connecting portions 6d connecting the higher position portions 6b and the lower position portions 6c. Bolt holes 6d are formed through the lower position portions 6c for accommodating fixing bolts 21.

The crawler panel 1 is formed with through holes 1d at positions to be aligned With the bolt holes 6d of the core metal 6 as the latter is assembled to the former. The fixing bolts 21 are inserted through a through openings 5a formed through the elastic member 5 and pass through the aligned bolt holes 6d and the through holes 1d to engage with nuts 21a. Therefore, the core metal 6 is rigidly fixed to the crawler panel.

FIGS. 20 through 25 show the ninth and tenth embodiments of the crawler pad according to the present invention. In these embodiments, contacting pieces 22a and 22b for engaging with the heads of the link mounting bolts 2 are provided on metal cores 23a and 23b. In the sixth embodiment shown in FIGS. 20 to 22, the contacting pieces 22a are separately formed and welded to the metal core 23a. On the other hand, in the seventh embodiment of FIGS. 23 to 25, a part of the metal core 23b serves as the integrally formed contact pieces 22b.

Figure 26:
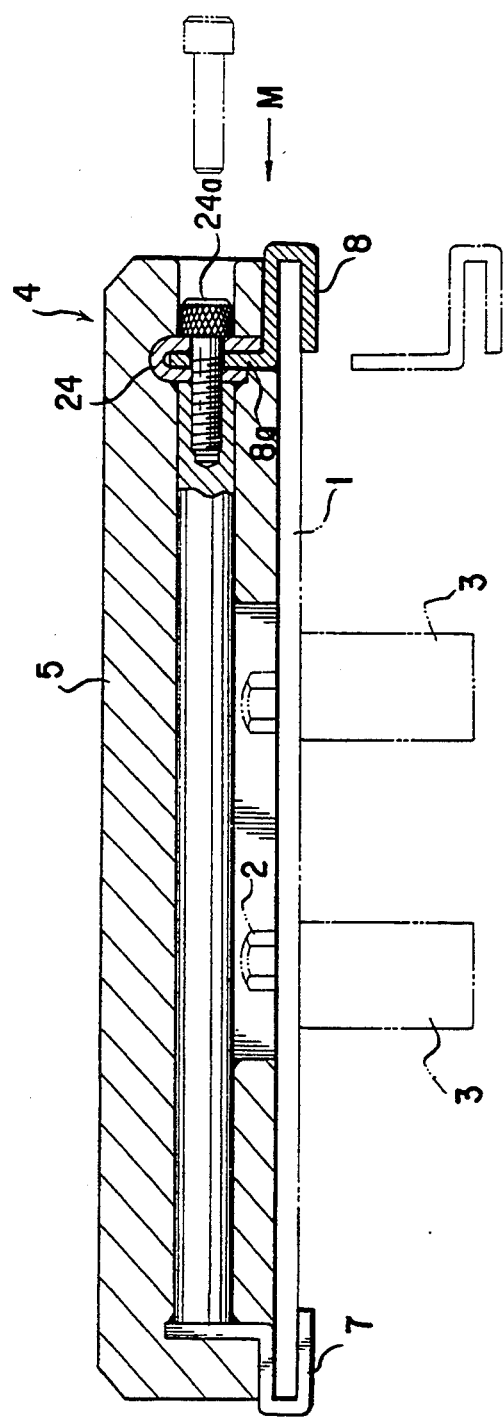
FIG. 26 is a section showing a construction at a connecting portion of a detachable hooking member in the eleventh embodiment of the crawler pad according to the invention.
Figure 27:
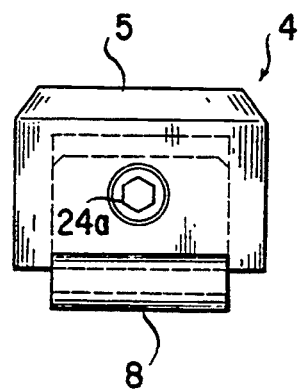
FIG. 27 is a view as viewed along the arrow M in FIG. 26.

FIGS. 26 and 27 show the eleventh embodiment of the crawler pad according to the present invention, in which the strength of the elastic member 5 at the side of the detachable hooking member 8 is increased while the mounting portion 8a of the detachable hooking member 8 can be buried in the elastic member 5.

Namely, in the shown embodiment, an engaging piece 24 which is bent into substantially U-shaped configuration with maintaining a mounting portion receptacle space, is rigidly secured to the other end of the metal core 23a. The mounting portion 8a of the detachable hooking member 8 is inserted into the mounting portion receptacle space of the engaging piece 24. Then, the mounting portion 8a is secured onto the other end of the metal core 23a by means of the fastening bolt 24a inserted through the end surface of the elastic body 5. In the shown embodiment, a bolt with a hexagonal groove in the head thereof is employed as the fastening bolt 24a. The fastening bolt 24a is tightened by means of a wrench or so forth with burying the head within the elastic member 5.

With the shown construction, since a support length for the elastic member 5 from the mounting position of the mounting portion 8a of the detachable hooking member 8 is expanded to provide increased reinforcement for the elastic member 5 for higher strength at the side end portion thereof.

Figure 28:
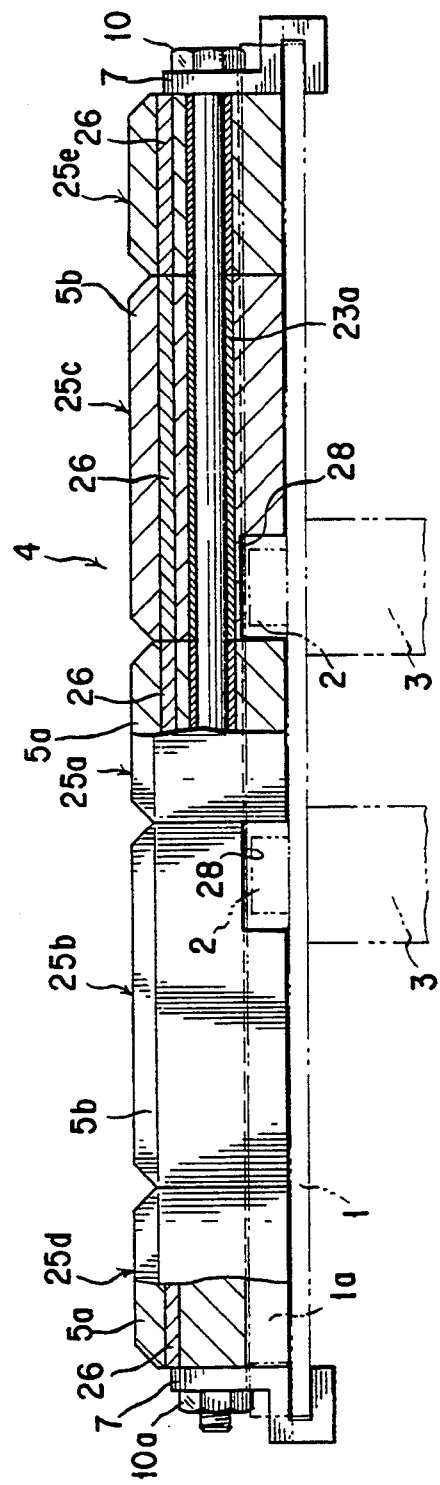
FIG. 28 is a longitudinal section showing a twelfth embodiment of the crawler pad according to the invention.
Figure 29A:
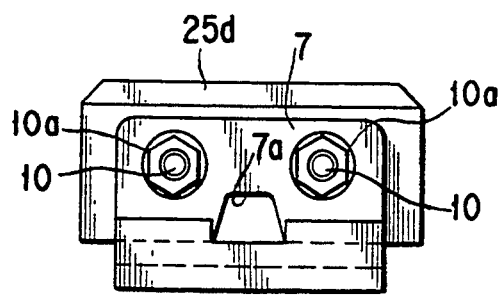
FIGS. 29A to 29D are illustration of respective portions of the crawler pad of FIG. 28.
Figure 29B:
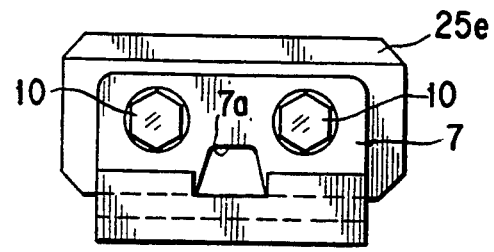
Figure 29C:
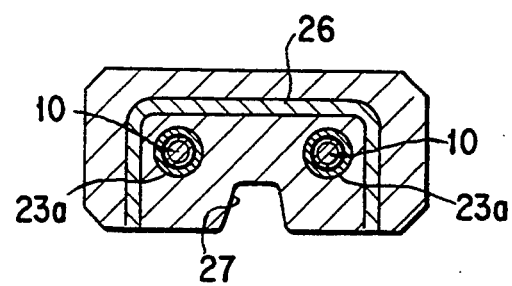

FIG. 28 shows a twelfth embodiment of the crawler pad according to the invention. The shown embodiment employs a plurality of mutually separated pad segments 25a, 25b, 25c, 25d and 25e. The segments 25d and 25e positioned at both longitudinal ends the pipe form metal core 23a have shorter length than the segments 25b and 25c. The central segments 23a may have the equal length to that of the segments 25d and 25e at both sides. Respective pad segments 25a~25e are formed of the elastic members 5a and 5b. Through respective elastic members 5a and 5b, reinforcements 26 which comprises a steel channel for construction or frame work and are commercially available, are extended in an integral fashion with the elastic member, as best shown in FIG. 29C. Longitudinally extending recesses 27 are formed on the surface of the elastic members 5a and 5b mating with the crawler panel 1 for accommodating therein the grouser 1a projecting from the general surface of the crawler panel 1. Also, the detachable hooking members 7 at both longitudinal sides are formed with recesses 7a for accommodating the grouser 1a, as shown in FIGS. 29A and 29B. In the shown embodiment, since the grouser 2 is extended longitudinally at substantially lateral center of the core metal 1, the recesses 27 are formed at the lateral center of respective elastic members 5a and 5b. In addition, the elastic members 5 of the segments 25b and 25c are formed with cut-out recesses 28 for accommodating heads of the link mounting bolts 2.

In the shown embodiment, the elastic members 5a forming the segments 25a, 25d and 25e are formed of an elastic material having relatively high rigidity, such as urethane rubber. On the other hand, the elastic members 5b forming the segments 25b and 25c are formed of an elastic material having relatively low rigidity, such as a white rubber or so forth. The thickness of the elastic members 5b is slightly higher than that of the elastic members 5a.

Figure 29D:
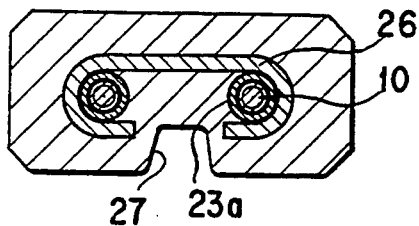
Figure 30A:
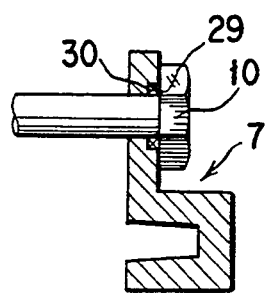
FIGS. 30A to 30C are illustration showing modifications of the twelfth embodiment of the crawler pad.
Figure 30B:
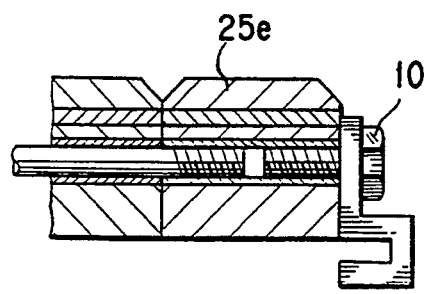
Figure 30C:
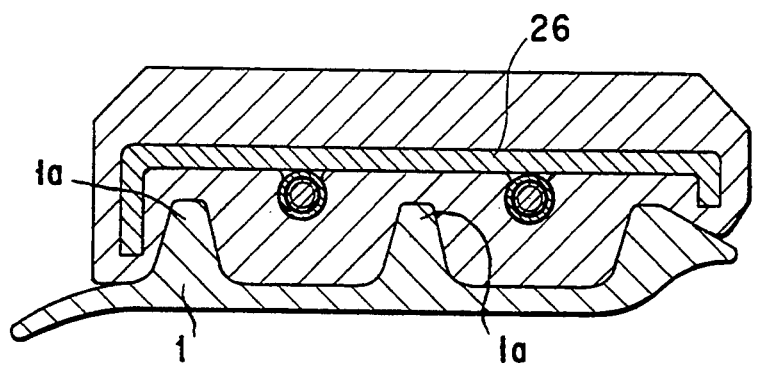

It should be noted that a tractive notching can be formed on the tread of the segments 25a~25e. Also, it should be appreciated that the specific configuration illustrated and discussed hereabove is mere example and not specific to the present invention. For instance, although the shown embodiment employs the channel shaped reinforcement 26, the configuration of the reinforcement is not essential for the present invention but can be of the generally elliptic or C-shaped configuration as illustrated in FIG. 29D. Also, the elastic members 5a and 5b may be formed with a plurality of recesses 27 for accommodating the grousers 2, as shown in FIG. 30C. Furthermore, a projection 29 may be formed on the bolt 10 to engage with one of engaging recess 30 for restricting the bolt 10 from rotating upon tightening of the nut 10a, as shown in FIG. 30A. In addition, in the shown construction, the bolt 10 extends through the overall length of the core metal 23a to extend therefrom to engage with the nut 10a. However, it is possible to form internal threads at both longitudinal ends of the core metal 23a to engage with bolts 10 having shorter stem length as illustrated in FIG. 30B.

Figure 31A:
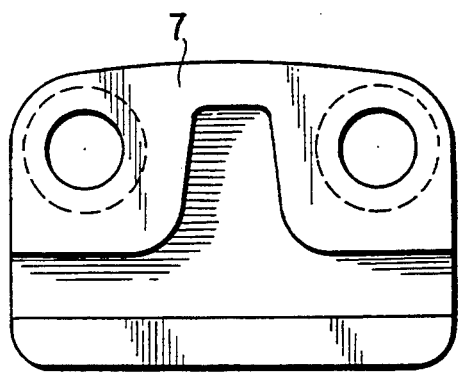
FIGS. 31A and 31B show a modification of the detachable hook member formed as a cast block.
Figure 31B:
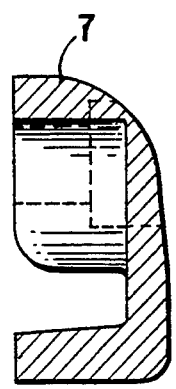
Figure 32:
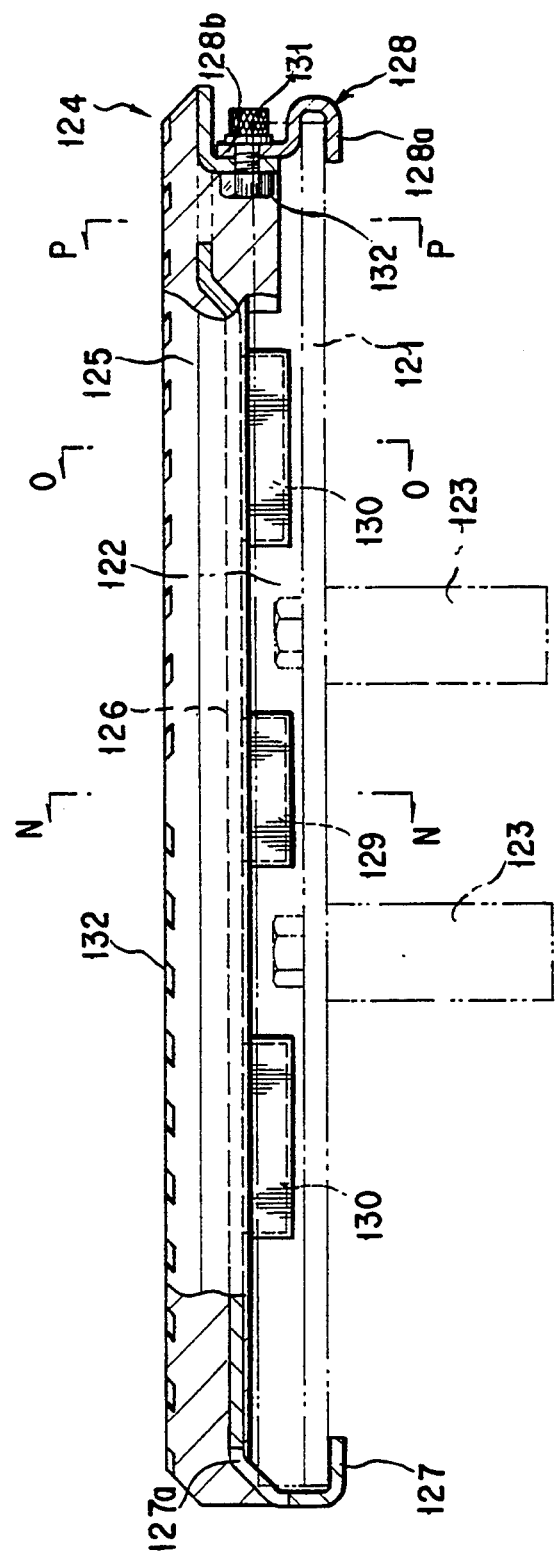
FIG. 32 is a partially sectioned front elevation of the fourteenth embodiment of the crawler pad according to the invention.

In addition, the detachable hooking member 7 may comprises a casted block, as shown in FIGS. 31A and 31B. In such case, the outer end of the cast block detachable hooking member 7 is chamfered for preventing concentration of stress, as shown in FIG. 31B.

FIGS. 32 to 36 show thirteenth embodiment of the crawler pad according to the present invention. The reference numeral 121 denotes a crawler plate for the dry ground, which is provided with grouser 122 substantially at the central position in the width direction. A plurality of crawler plates 121 are connected via a track link 123 coupled by means of four link mounting bolts in order to form an endless crawler.

The reference numeral 124 denotes the thirteenth embodiment of a crawler pad according to the present invention, which is detachably mounted on the tread surface of each of the crawler plates 121. The crawler pad 124 includes an elastic member 125 forming new tread, a metal core 126 serving as a reinforcement member, a fixed hooking member 127 which is rigidly secured on one end of the metal core 126 and a detachable hooking member 128 detachably secured on the other end of the metal core 126.

The metal core 126 is substantially plate form. At the central portion in the width direction and at the central portion in the longitudinal direction of the back side, the metal core 126 is formed with engaging pieces 129, 129 by way of punching the blank forming the metal core and being the punched pieces. The engaging pieces 129, 129 are formed into essentially reversed U-shaped configuration. Also, the metal core 126 is provided with leg pieces 130, 130 at both edges in the width direction and in the vicinity of both longitudinal ends. The leg pieces 130, 130 extends from the back side of the metal core 126. Furthermore, a nut member 132 is rigidly secured on one longitudinal end of the metal core 126 for receiving a fastening bolt 131 for securing the detachable hooking member onto the corresponding longitudinal end.

The detachable hooking member 128 includes a hook portion 128a a for engaging with the side edge of the crawler plate 121 and a mounting portion 128b to be secured on the metal core 126. The mounting portion 128b is bent inwardly from the hook portion 128a in the longitudinal direction so that the head of the bolt 131 will not be projected from the end face of the hook portion 128a. At the intermediate portion between the both hooking members 127 and 128, the metal core 126 is formed with grouser receptacle recesses 127a and 128c for receiving the grouser 122 of the crawler plate 121 is provided.

The elastic member 125 is baked onto the metal core 126 substantially surrounding the metal core 126. The thickness of the elastic member 125 is selected to provide predetermined elasticity at the surface side and to merely cover the metal core 126 at the back side. Also, the engaging pieces 129, 129 and the leg pieces 130, 130 projecting at the back side of the metal core 126 are also covered with the elastic member 125. The elastic member 125 at the positions of the engaging pieces 129, 129 and the leg pieces 130, 130 extends through the punched opening to connect the surface side and back side.

The reversed U-shaped engaging pieces 129, 129 which are surrounded by the elastic member 125 define internal clearance to engage with the grouser 122 of the crawler 121. On the other hand, the heights of the engaging pieces 129, 129 and the leg pieces 130, 130 in the condition covered by the elastic member 125 is selected to contact with the tread surface of the crawler plate 121 at the position where both hooking members 127 and 128 are engaged.

In the construction set forth above, the shown embodiment of the crawler pad 124 is mounted on the crawler plate 121 through the following process. Initially, the fixed hooking member 127 is engaged to one edge of the crawler plate 121 with contacting the engaging pieces 129 and the leg pieces 130 projecting from the back side of the metal core 126 onto the tread surface of the crawler plate 121. In conjunction therewith, the engaging pieces 129 are engaged with the grouser 122. Subsequently, the detachable hooking member 128 is engaged to the other edge of the crawler plate 121 and fixed to the other end of the metal core 126. As set forth above, the bolt 131 employed for securing the detachable hooking member 128 onto the metal core 126 will never projects its head outside of the end surface of the detachable hooking surface.

With the shown embodiment, since the elastic member 125 is mainly provided on the surface side of the metal core 126 and a substantial clearance is left between the metal core 126 and the tread surface of the crawler plate 121, the necessary amount of the elastic material for forming the elastic member 125 can be minimized to permit reduction of the cost for the elastic material. Also, with the shown construction, the crawler pad 124 can be used until almost all surface side elastic member 125 is worn. Thus, the duration of the crawler pad 124 can be expanded. Furthermore, when the elastic member 125 is worn, new elastic member 125 can be baked on the surface of the metal core 126. Therefore, the metal core 126 can be recycled for contributing lowering of the cost.

In addition, with the shown embodiment, upon mounting the crawler pad 124 onto the crawler plate 121, the fixed hooking member 127 is initially hooked to one edge of the crawler plate 121, then the detachable hooking plate 128 is hooked to the other edge of the crawler plate 121 and secured to the other end of the crawler pad 124 by means of the fastening bolt 131. Therefore, the shown embodiment of the crawler pad 124 can be mounted on the crawler plate 121 only at one side of the crawler to provide enhanced workability. Furthermore, since the head of the bolt 131 for securing the detachable hooking member 128 is not projected from the end of the crawler pad 124, safety in the condition where the crawler pad 124 is mounted on the crawler plate 121 can be assured.

It should be noted that it is possible to provide two sets of the reversed U-shaped engaging pieces 129, 129 at the positions in the vicinity of respective longitudinal ends and to provide the leg pieces 130, 130 at the longitudinal center portion. In short, number and position of the engaging pieces 129 and the leg pieces 130 are not specified and can be arbitrary selected.

Also, the construction of the portion form securing the detachable hooking member 128 can be modified to project a bolt member from the end of the metal core 126 so that the detachable hooking member 128 is engaged with the bolt and firmly secured by tightening a nut on the bolt.

Figure 37:
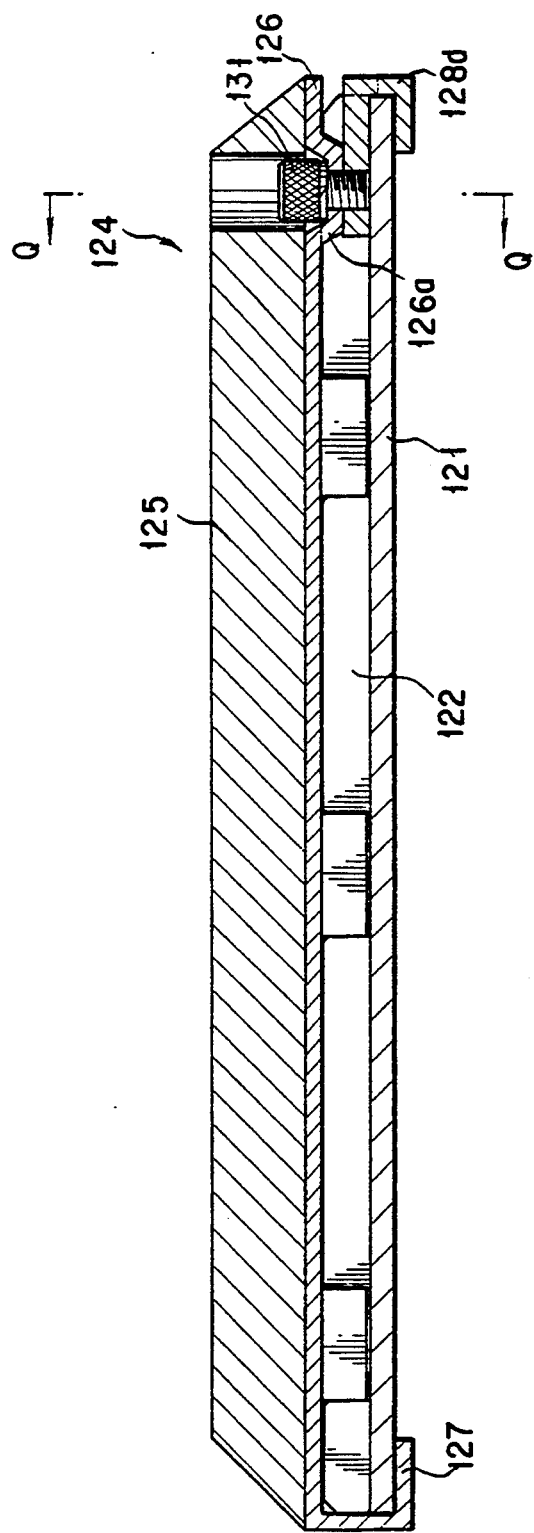
FIG. 37 is a partially sectioned front elevation of the fourteenth embodiment of the crawler pad according to the invention.
Figure 38:
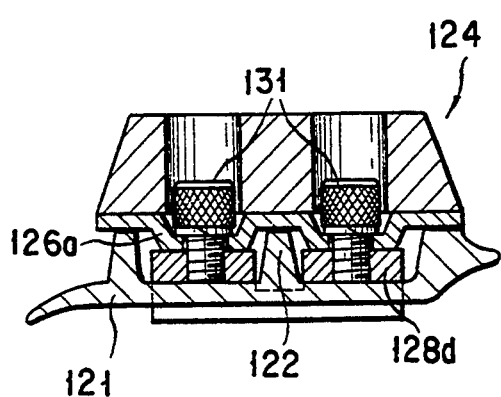
FIG. 38 is a section taken along line Q—Q of FIG. 37.

In addition, although the foregoing embodiments employs the bolts 10, 131 for securing the detachable hooking member 8 and 128 to engage with the metal core 6, 126 in the lengthwise direction, the detachable hooking member 8, 128 may be secured onto the metal core 6, 126 by engaging the bolt 10, 131 in the thicknesswise direction through the elastic member 125, as in the fourteenth embodiment illustrated in FIGS. 37 and 38.

In this case, a seat portion 126a is formed in the metal core 126 for the bolt 131. The detachable hooking member 128 is placed and secured at the back side of this seat portion 126a.

Figure 34:
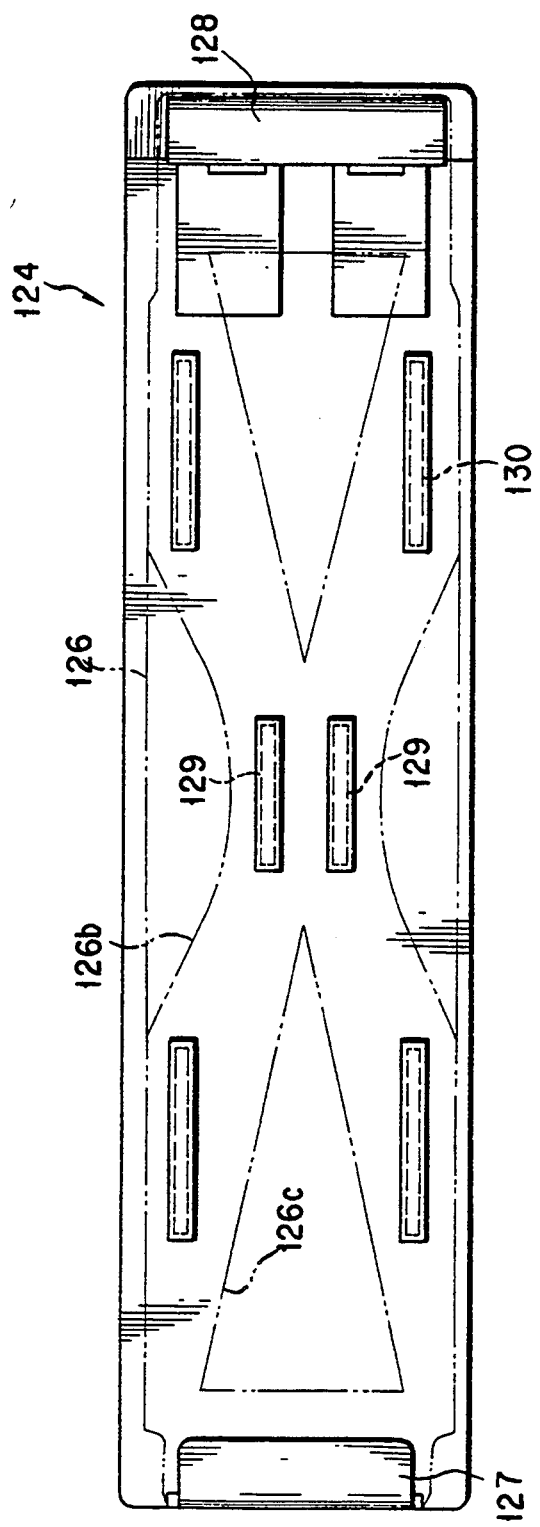
FIG. 34 is a bottom view of the thirteenth embodiment of the crawler pad of FIG. 33.
Figure 35A:
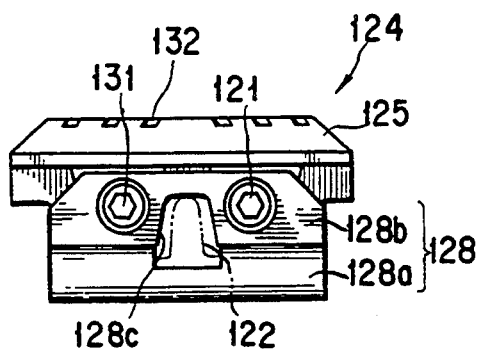
FIG. 35A is a right side view of the thirteenth embodiment of the crawler pad.
Figure 35B:
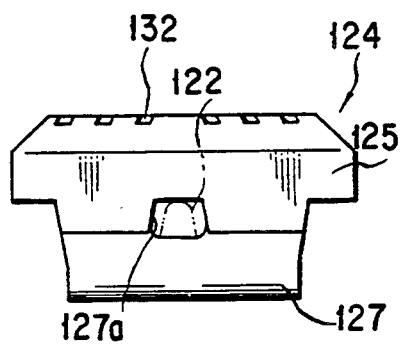
FIG. 35B is a left side view of the thirteenth embodiment of the crawler pad.
Figure 36A:
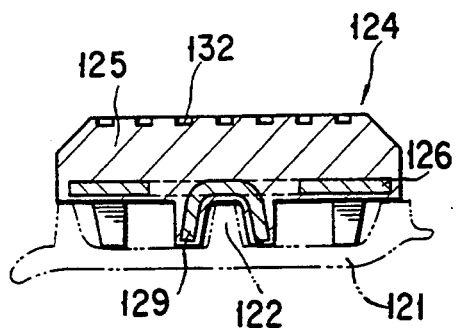
FIG. 36A is a section taken along the line N—N of FIG. 32.
Figure 36B:
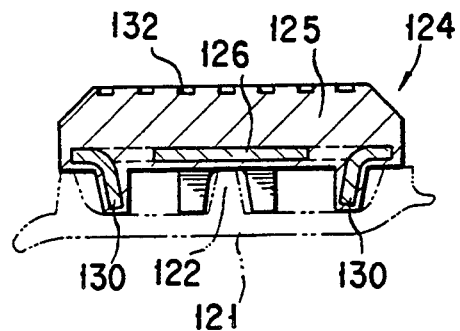
FIG. 36B is a section taken along the line O—O of FIG. 32.
Figure 36C:
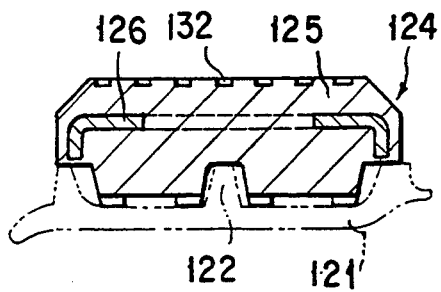
FIG. 36C is a section taken along the line P—P of FIG. 32.

Also, although the metal core 126 can be simple rectangular configuration as illustrated in FIG. 34, it is also possible to provide cut-outs 126b and 126c as illustrated in phantom lines in FIG. 34 in the extent not to degrade the strength of the metal core for lighter weight.

Figure 33:
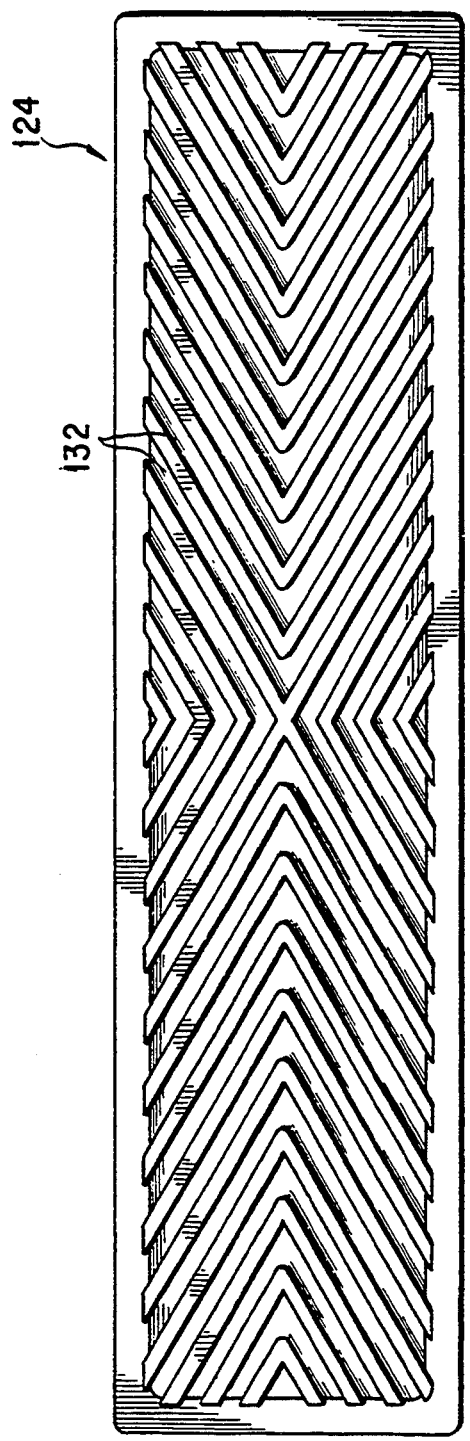
FIG. 33 is a plan view of the fourteenth embodiment of the crawler pad of the invention.

The tread surface of the elastic member 125 fixed to the surface side of the metal core 126 can be of a flat plate like configuration for example, with a chamfered circumferential edge. On the overall tread surface of the elastic body 125, a plurality of essentially V-shaped anti-slip notches 132 directed toward the center are formed, as shown in FIG. 33. However, the pattern of the anti-slip notches 132 should not be specified to the shown pattern but can be of any patterns suitable for achieving the anti-slip effect.

Figure 39A:
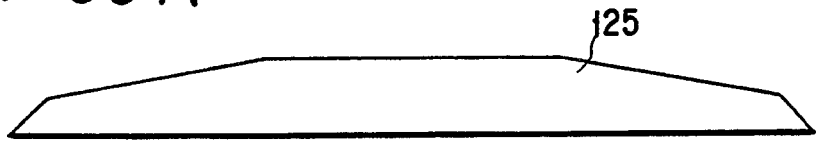
FIGS. 39A through 39F are explanatory illustrations showing various sectional configurations of elastic members.
Figure 39B:
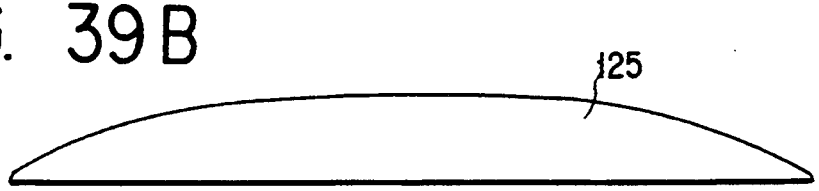
Figure 39C:
Figure 39D:

Furthermore, the tread surface configuration of the elastic member 125 is not specified to the flat plate form, but can be of various cross sectional configurations as shown in FIGS. 39A to 39F, for example. The cross sectional configurations in FIGS. 39A and 39B are singular peak construction with thicker longitudinal central portion. The cross sectional configurations in FIGS. 39C and FIG. 39D are dual peak construction with thinner longitudinal center portion. In case of the singular peak configuration, the elastic member 125 may contact with the ground only at the thicker central portion to reduce a tread area to provide higher steering performance. The singular peak configuration of the elastic member 125 also avoid excessive load at both ends to contribute prevention of occurrence of crack in the elastic member. On the other hand, the dual peak configurations may provide stability in case that the load are applied at longitudinal both end portions of the crawler plate 121, such as in application for a crane or so forth.

Figure 39E:
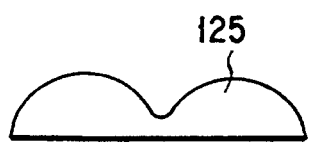
Figure 39F:
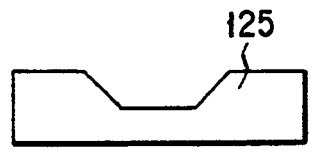

Also, the cross section in the widthwise direction can be of the configuration having thinner center portion to contact with the ground at two positions, as illustrated in FIGS. 39E and 39F. In this case, slip in the vehicular traveling direction can be eliminated to improve transmission of the driving force to the ground.

Figure 40:
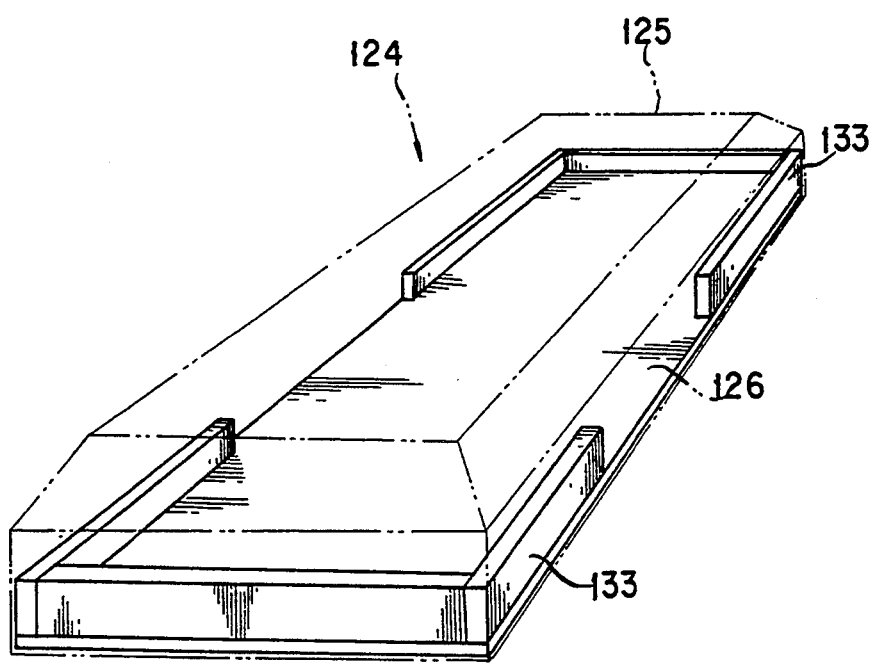
FIG. 40 is a fragmentary perspective view of the fifteenth embodiment of the crawler pad of the present invention, in which a frame is provided on both sides of a metal core.

The elastic member 125 is rigidly fixed on the overall surface at the surface side of the metal core 126. In such case, it is possible to project frames 133 from the both longitudinal edges of the metal core 126 so that the frames 133 are buried in the elastic member 125 for fixing the elastic member to metal core, as in the fifteenth embodiment illustrated in FIG. 40.

With the construction set forth above, deformation of the elastic member 125 can be successfully prevented.

Figure 41:
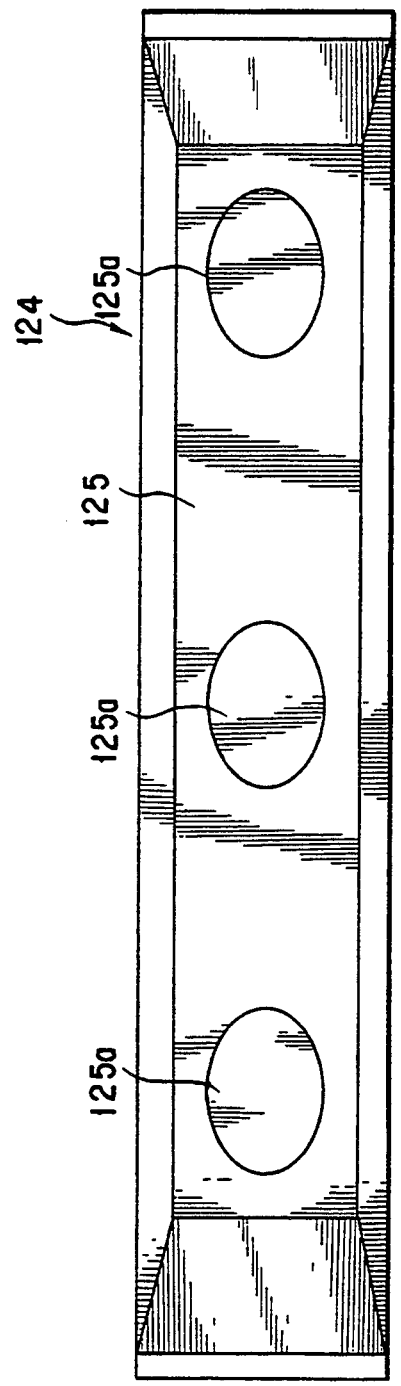
FIG. 41 is plan view of the construction of the sixteenth embodiment of the crawler pad according to the invention, in which the different hardness of elastic member is provided at a tread portion.

As the material of the elastic member 125, a mixture material of SBR and NR3 can be employed, for example. The proper hardness of the mixture material is about 50° to 90°. Although the elastic member 125 can be formed to have uniform hardness, at the hardness of 65° for example, it is also possible as in the sixteenth embodiment illustrated in FIG. 41, to have a plurality of portions formed of a harder rubber material of the hardness in a range of 70° to 100 ° m preferably 85° buried in a plurality of tread portions formed of a softer rubber material of the hardness of 65°. With such construction, a wear resistance can be improved substantially without degrading softness.

Figure 39G:
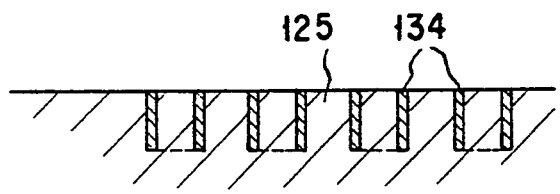
FIG. 39G is a section showing an example, in which a spike is buried in the elastic member.

Also, by implanting a plurality of spikes formed of a metal or plastic pipes as illustrated in FIG. 39G, wear resistance, traction performance and anti-slip performance at icy road surface can be improved.

Figure 42:
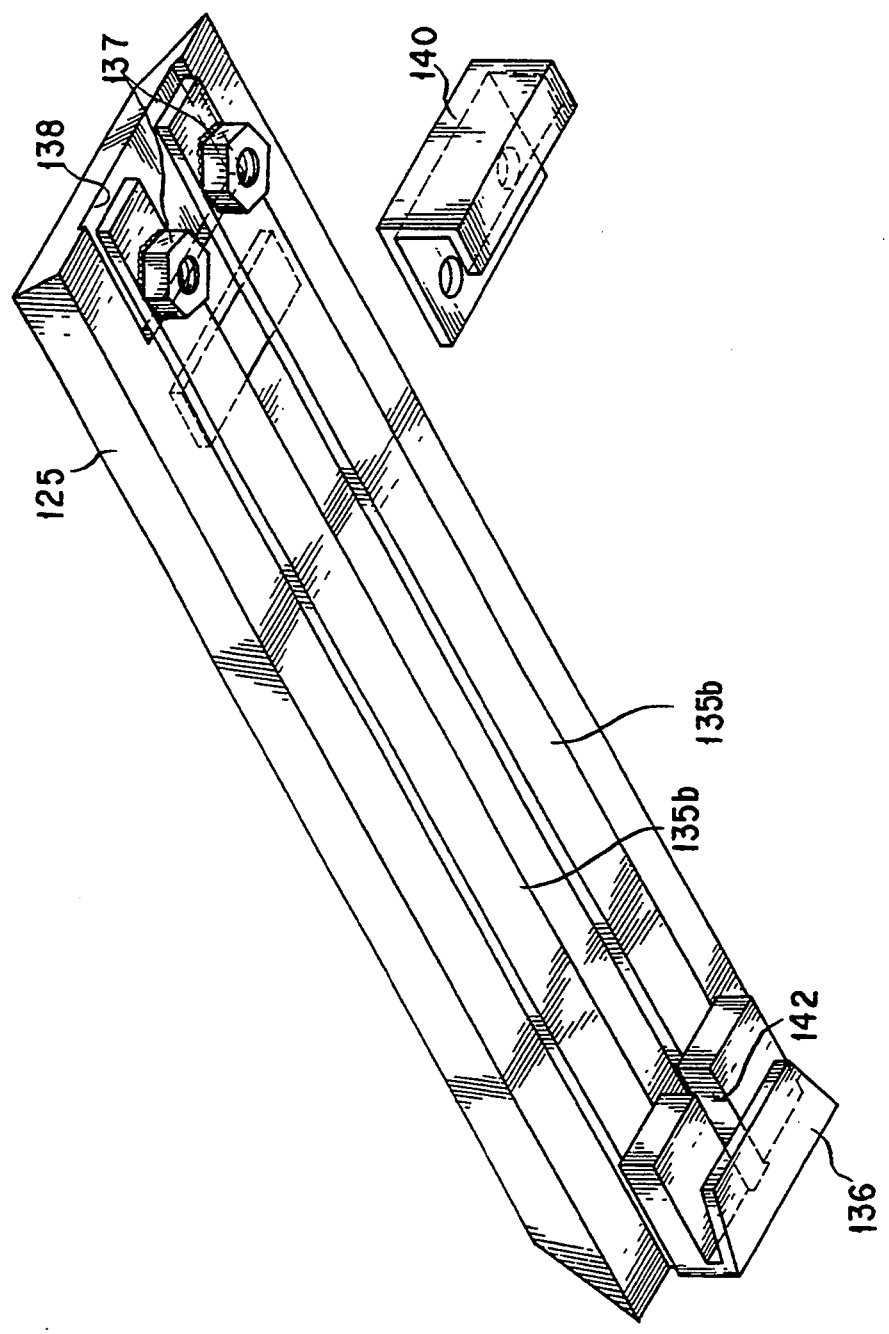
FIG. 42 is an exploded perspective view of the seventeenth embodiment of the crawler pad according to the invention.
Figure 43:
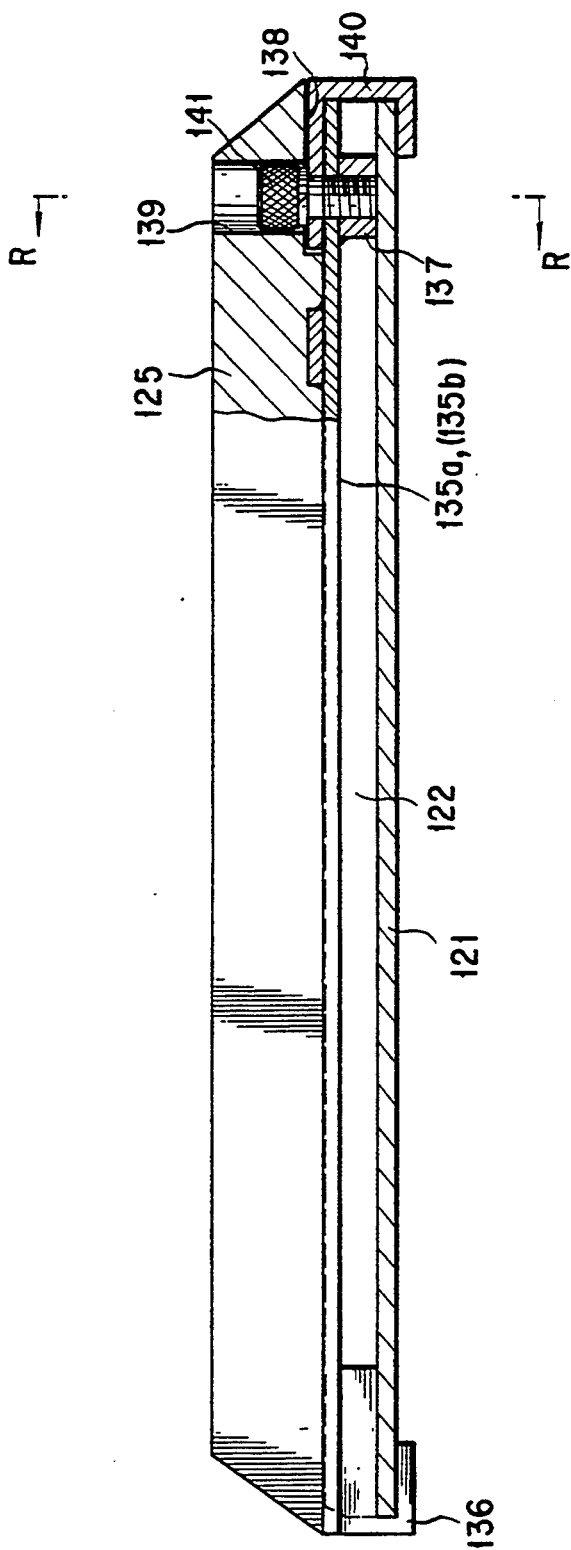
FIG. 43 is a longitudinal section of the crawler pad of FIG. 42.
Figure 44:
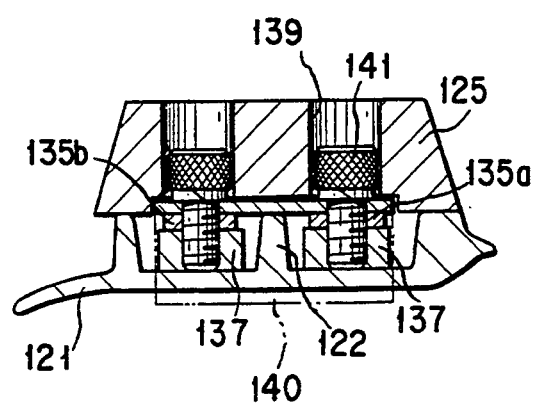
FIG. 44 is a section taken along the line R—R of FIG. 43.

FIGS. 42 to 44 show the seventeenth embodiment of the crawler pad according to the invention, in which the construction of the metal core is modified. In the shown construction, a fixed hooking member 136 is fixed at one ends of two strip form metal cores 135a and 135b. On the back side surface at the other end of the metal cores 135a and 135b, nut members 137 are rigidly secured. On the surface side of the metal cores 135a and 135b, an elastic member 125 is rigidly secured. The elastic member 125 is formed with a recess 138 extending along the surface side surface of the metal cores 135a and 135b. Also, the elastic member 125 is formed with through openings 139 at positions corresponding to the nut members 137. A mounting portion of a detachable hooking member 140 is inserted in the recess 138 and fixed thereonto by bolts engaged through the openings 139. BY this, the detachable member 140 can be fixed on the metal cores 135a and 135b.

In the shown embodiment, a groove 142 for engaging with a part of the grouser 122 of the crawler plate 121 is provided in the fixed hooking member. The other end of the grouser 122 may engage with a clearance defined between the nut members 137, 137.

On the other hand, to the tread of the crawler plate 121, the back side end face of a mounting portion of the fixed hooking member 136 and the end faces of the nut members 137, 137 are contacted. With this arrangement, a clearance is defined between the crawler plate 121 and the metal cores 135a and 135b, in which the head of the link mounting bolts can be received.

The eighteenth embodiment of the crawler pad according to the present invention will be discussed hereinbelow with reference to FIGS. 45 to 51.

In FIGS. 45 to 51, the reference numeral 151 denotes a crawler plate for dry ground, which is provided with grousers 152a, 152b and 152c extending longitudinally at the central portion and both side portions. A plurality of the crawler plates 151 are connected into an endless form by means of a link 153 for forming the crawler.

The reference numeral 154 denotes a crawler pad which is detachable to the tread of each crawler plate 151. The crawler pad 154 includes an elastic member 155 forming a tread, a metal core 156 reinforcing the elastic member 155, a fixed hooking member 157 fixed at one end of the metal core 156 in integral fashion, and a detachable hooking member 158 detachably secured at the other end of the metal core.

Figure 47:
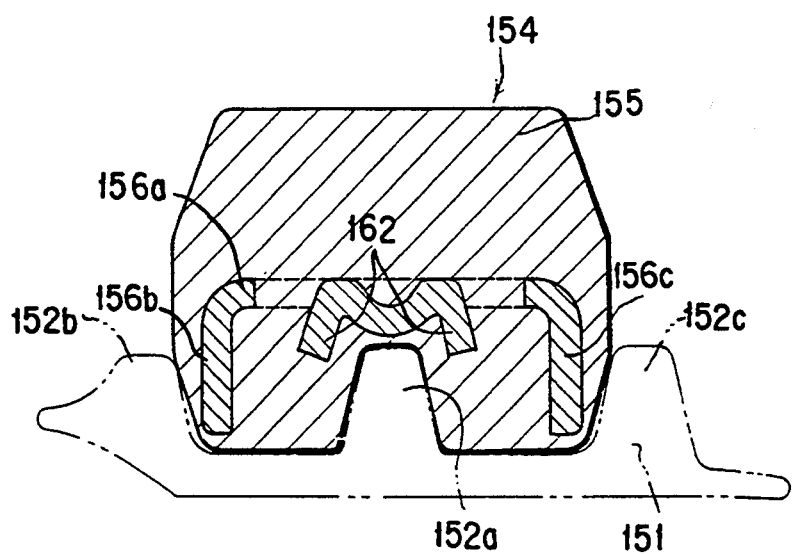
FIG. 47 is a section taken along the line S—S of FIG. 46.
Figure 49:
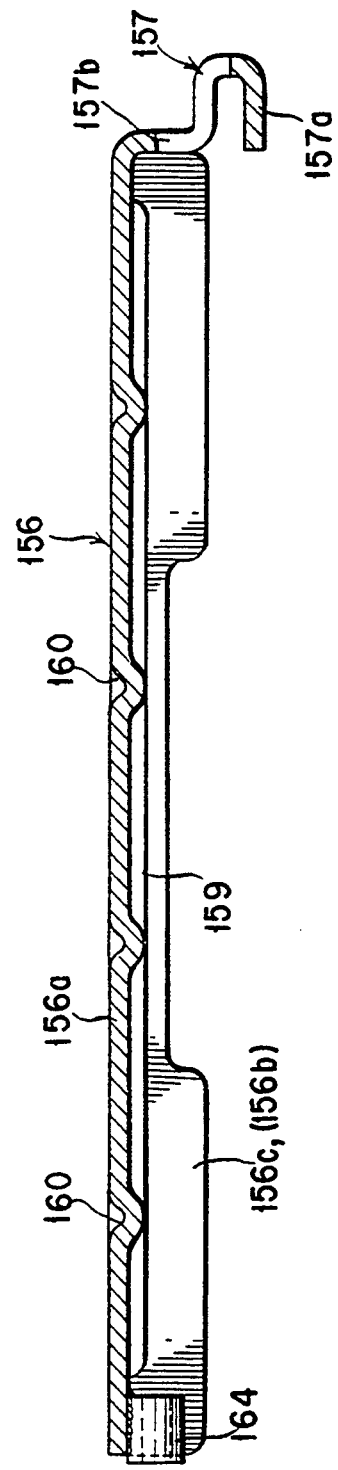
FIG. 49 is a section of the metal core in the eighteenth embodiment of the crawler pad of the invention.
Figure 50:
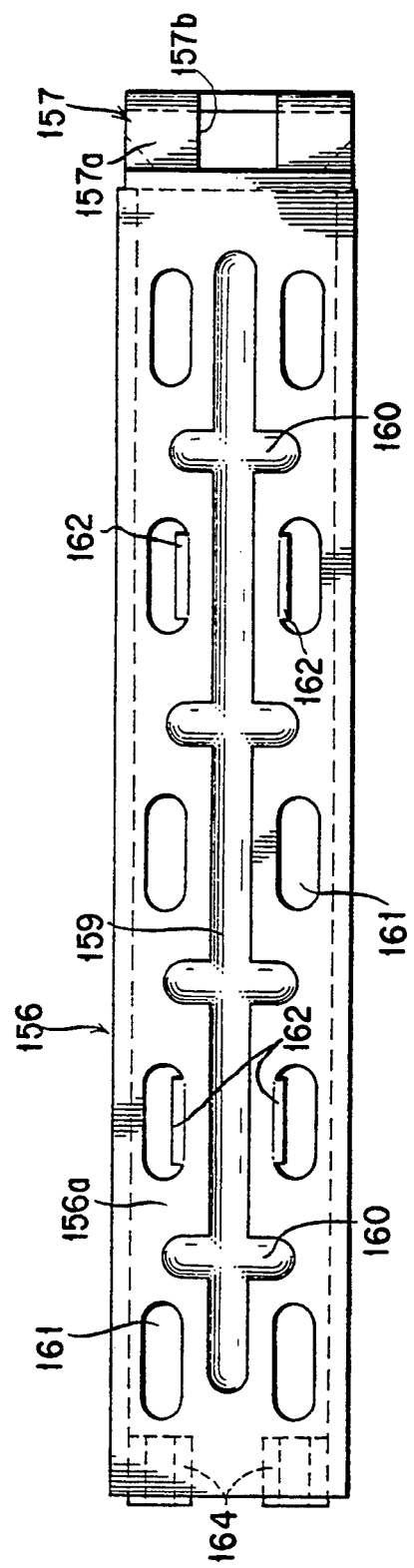
FIG. 50 is a plan view of the metal core in the eighteenth embodiment of the crawler pad of the invention.

The metal core 156 is formed in a plate form configuration illustrated in FIGS. 49 and 50, which is formed into a sectionally back side opened box-shaped configuration with a sectionally flat plate like portion 156a and side plate portions 156b and 156c formed by bending both sides of the flat plate like portion backwardly. At the center of the flat plate like portion 156a in the width direction, a longitudinally extending rib 159 is provided. Also, at longitudinal intermediate positions of the rib 159, a plurality of laterally extending ribs 160 are provided. Furthermore, at a plurality of laterally symmetrical positions, through openings 161 are formed, as best shown in FIG. 50. In addition, at longitudinal symmetric position relative to the longitudinal center and laterally spaced pairs of punched pieces 162, 162 are formed. The punched pieces 162, 162 are bent backwardly in essentially M-shaped configuration as best seen in FIG. 47.

Figure 51A:
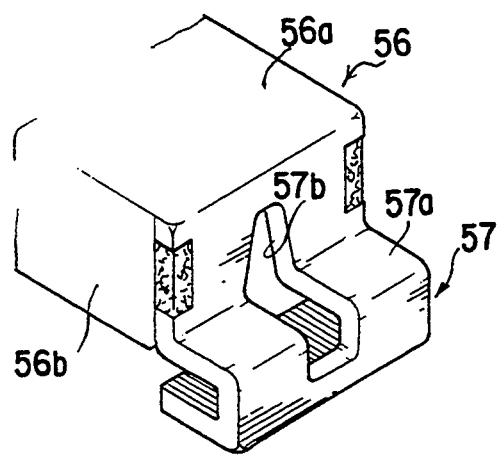
FIG. 51A is a perspective view showing the major portion at the fixed hooking member of the metal core.

The hook portion 157a of the fixed hooking member 157 which is integrally formed with the metal core 156 and adapted to engage with one edge of the crawler plate 151 is stepped down the corresponding end of the metal core 156 and extending therefrom. In the stepped portion, an engaging opening 157b is provided for engaging with one end of the central grouser 152a of the crawler plate 151. To the stepped portion, the ends of the side plates 156b and 156c at both sides of the flat plate like portion 156a are connected by welding as best shown in FIG. 51A.

A nut member 164 is rigidly secured on the other end of the metal core 156 for securing the detachable hooking member 158 by means of the bolt 163.

Figure 51B:
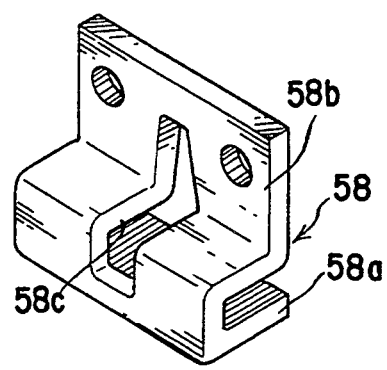
FIG. 51B is a perspective view of a detachable hooking member.

The detachable hooking member 158 is formed into a configuration as illustrated in FIG. 51B, which includes a hook portion 158a for engaging with the end edge of the crawler plate 151 and a mounting portion 158b to be secured onto the metal core 156. The mounting portion 158b is situated inside of the hook portion 158a so that the head of a fastening bolt 163 will never project from the end face of the hook portion 158a. Similarly to the fixed hooking member 157, the detachable hooking member 158 is formed with an engaging opening 158c for engaging with the central grouser 152a of the crawler plate 151.

Figure 45:
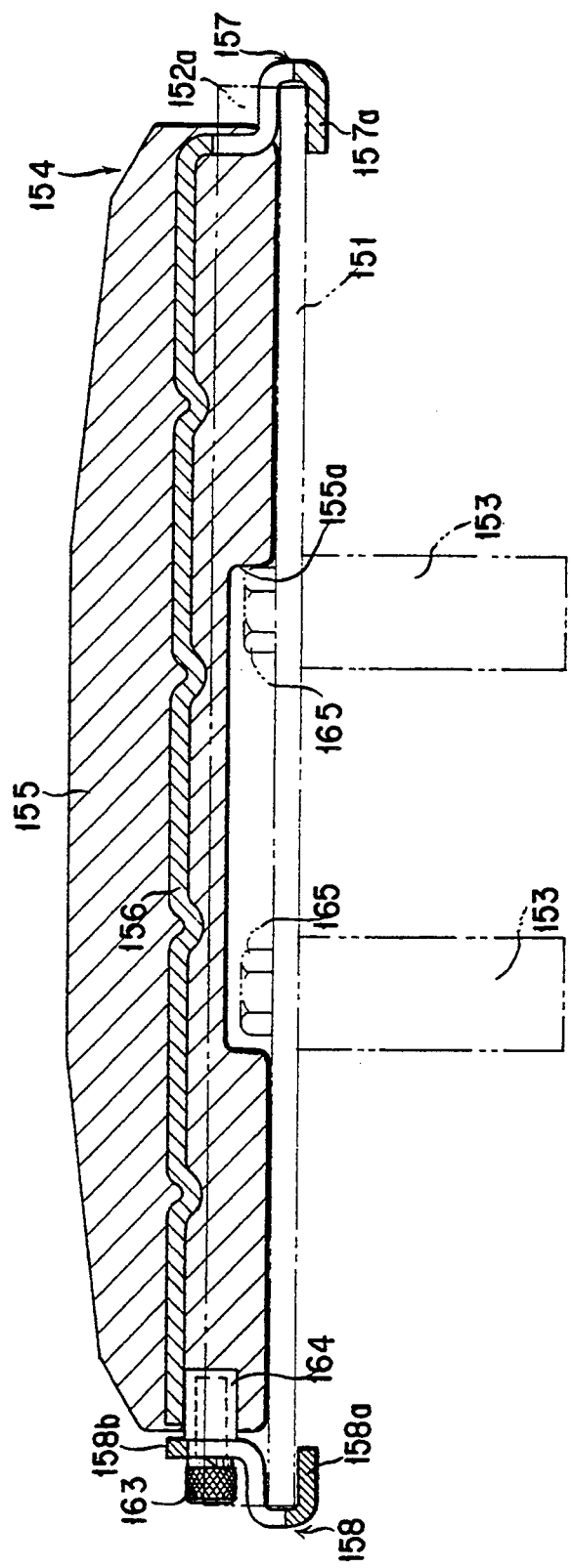
FIG. 45 is a section of the eighteenth embodiment of the crawler pad.
Figure 46:
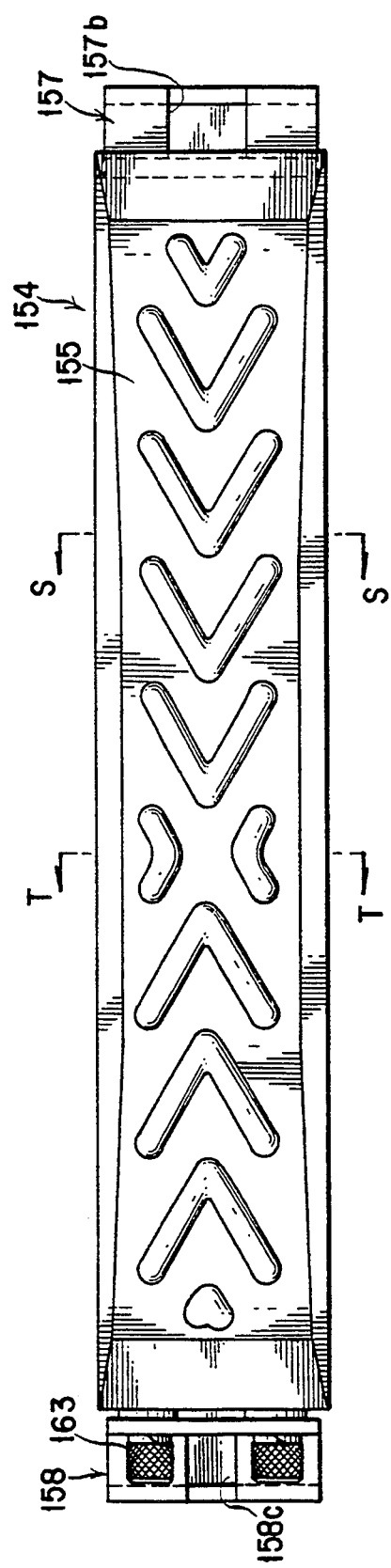
FIG. 46 is a plan view of the eighteenth embodiment of the crawler pad.
Figure 48:
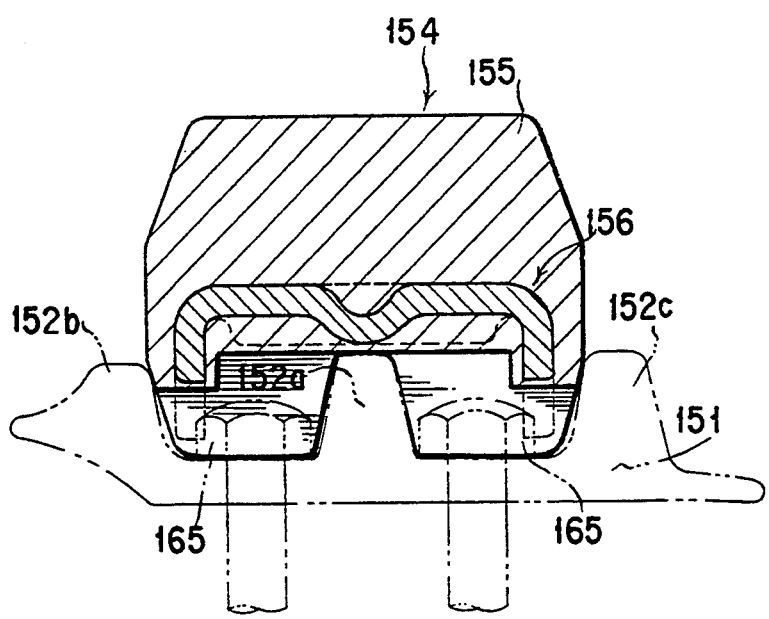
FIG. 48 is a section taken along the line T—T of FIG. 46.

The elastic member 155 is rigidly fixed to the metal core 156 surrounding the latter. The configuration of the back side of the elastic member 155 at the portions other than those corresponding to the link mounting bolts 165 has a recess for engaging over the central grouser 152a and to internally engage with the grousers 152b and 152c at both sides, as illustrated in FIG. 47. The elastic member 155 further has a configuration at the positions corresponding to the link mounting bolts 165 to define a clearance for receiving the head of the link mounting bolts 165, to contact with the top end of the central grouser 152a and to internally engage with the side grousers 152b and 152c at both sides, as shown in FIG. 48. At the later position, the height of the side plates 156b and 156c of the metal core 156 is also adapted so as not to interfere with the link mounting bolts 165. As shown in FIG. 45, the longitudinal edge 155a of the link mounting bolt receptacle recesses formed in the back side of the elastic member 155 elastically contacts with the heads of the link mounting bolts 165.

On the other hand, the surface side configuration of the elastic member 155 is moderately convexed shape in the longitudinal direction. The elastic member 155 is longitudinally terminated at the stepped portion of the fixed hooking member 157. Also, the elastic member 155 is longitudinally terminated in the vicinity of the end of the metal core 156. At both longitudinal ends of the convexed profile are terminated at the position inwardly offsetting from the longitudinal ends of the metal core 156 in the magnitude of approximately 10 mm.

The back side portion and the surface side portion of elastic member 155 are integrally connected to each other thorough punched openings 161 and the punched pieces 162, 162 provided in the flat plate like portion 156a.

The crawler pad constructed as set forth above is mounted on each crawler plate 151 forming the crawler. Initially, the detachable hooking member 158 is released from the metal core 156. At this condition, the crawler pad is mounted on the tread of the crawler plate 151 by engaging the fixed hooking member 157 to one edge of the crawler plate 151. At this time, the elastic member 155 engages with respective grousers 152a, 152b and 152c of the crawler plate 151.

Subsequently, the detachable hooking member 158 is engaged to the other edge of the crawler plate 151. Then, the detachable hooking member 158 fixed to the metal core 156 by tightening the fastening bolt 163 to the nut member 164.

At this time, the mounting length of the crawler pad is slightly shorter than the crawler plate 151 so that both hooking members 157 and 158 can be tightly engaged with both edges of the crawler plate 151 by tightening of the fastening bolt 163.

On the other hand, at the position where the crawler pad is mounted on the crawler plate 151, the back side of the crawler pad engages with the grousers 152a, 152b and 152c. Also, both longitudinal ends of the central grouser 152a extends through the engaging openings 157b and 158c of the hooking members 157 and 158.

With the shown embodiment, since the crawler pad 154 can be attached and detached onto and from the crawler plate 151 simply by fixing and releasing the detachable hooking member 158, workability in installation of the crawler pad to the crawler plate can be significantly improved and made easier in comparison with the conventional crawler pads which require attaching and detaching the hooking members at both sides of the crawler. Also, by arranging the mounting position of the detachable hooking member 158 is shifted toward inside for the extend greater than the height of the head of the fastening bolt 163, the bolt head will never project from the side of the crawler for assuring safety while the crawler pad is mounted on the crawler plate.

In addition, according to the shown embodiment, by constructing the metal core 156 into a back side opened box-shaped configuration and by providing the fixed hooking member 157 integrally with the flat plate like portion 156a via the stepped portion, the strength of the metal core 156 is improved for assuring prevention of deformation during use.

Furthermore, since the surface side of the metal core 156 is substantially flat, the metal core 156 can be recycled for use even after wearing of the elastic member 155 in the predetermined magnitude. Also, since the elastic member 155 is adapted to directly contact with the grouser 152a of the tread of the crawler plate and with the link mounting bolts 165, the crawler pad 154 will not create a play with the crawler plate 151 with firmly maintaining the same while the vehicle travels.

In addition, according to the shown embodiment, since the longitudinal ends of the side plates of fixed hooking member 157 are welded to the stepped portion, the deformation of the metal core 156 can be certainly prevented. Furthermore, since the fixed hooking member 157 and the detachable hooking member 158 are provided with the engaging openings for engaging with the longitudinal ends of the grouser 152a of the crawler plate 151, the crawler pad 154 can be held further firmly in the longitudinal directions.

Also, since the elastic member 155 is terminated slightly inside of the flat plate like portion of the crawler plate 151, damaging of the edge portion of the elastic member 155 can be successfully prevented. Furthermore, since the width of the elastic member 155 mounted on the metal core 156 is shorter than that of the crawler plate, the play in the vehicular traveling direction and damaging of the lateral edge portions of the elastic member 155 can be successfully prevented.

Figure 52:
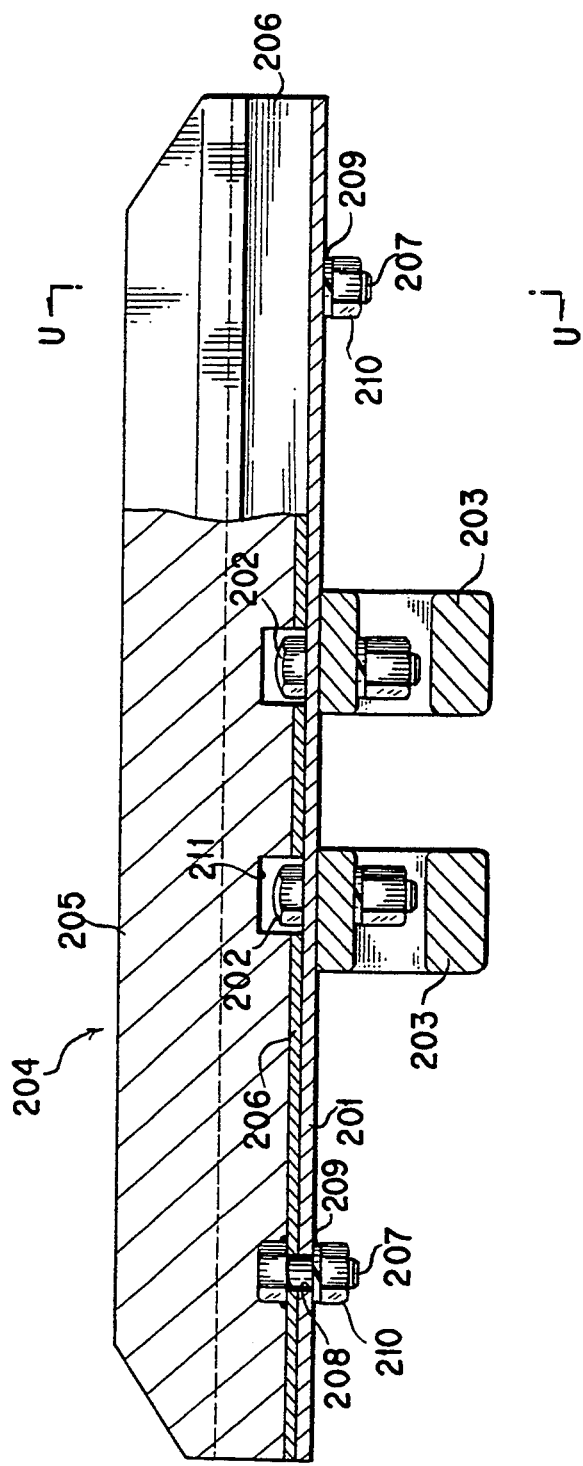
FIG. 52 is a longitudinal section of the nineteenth embodiment of the crawler pad according to the invention.
Figure 53:
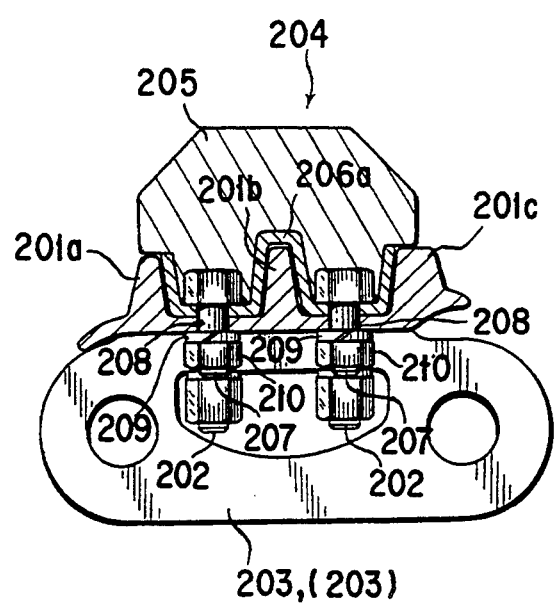
FIG. 53 is a section taken along line U—U of FIG. 52.
Figure 54:
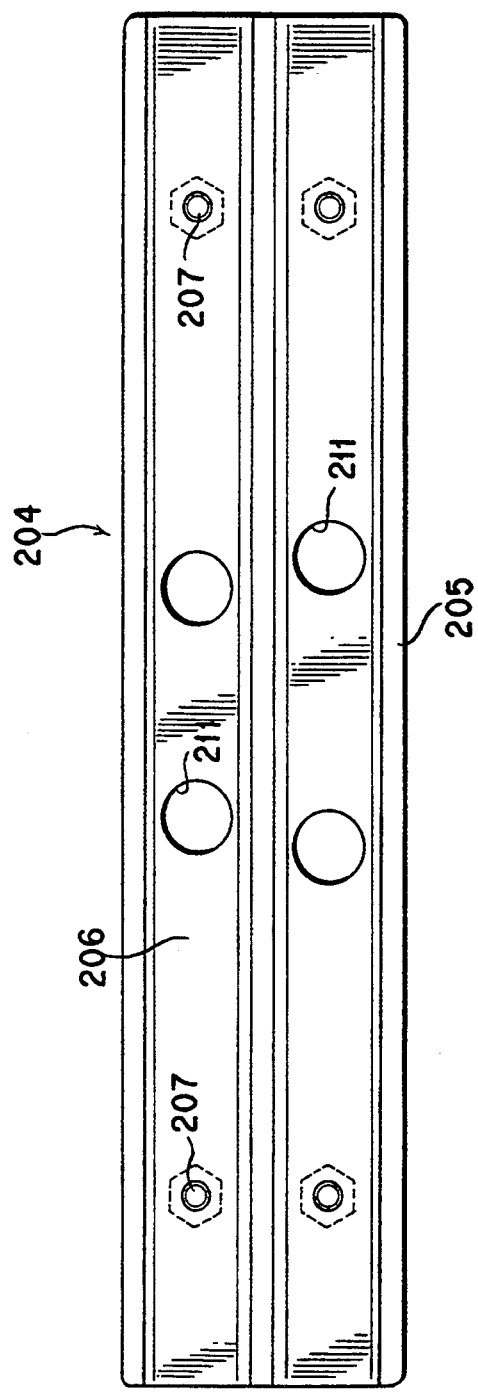
FIG. 54 is a bottom view of the nineteenth embodiment of the crawler pad.

FIGS. 52 to 54 show the nineteenth embodiment of the crawler pad according to the present invention. The illustrated embodiment in FIGS. 52 to 54 is the crawler pad 304 adapted to a dry type crawler panel 201 for bulldozer. A plurality of the crawler panels 201 are connected in an endless form by means of track links 203 which are fixed to the crawler panel by means of link mounting bolts 202. As can be seen from FIG. 52, cut-out recesses 211 are formed in the elastic member 205 for accommodating the head of the link mounting bolts 202.

The crawler pad 204 comprises an elastic member 205 forming a tread as assembled to the crawler panel 201 and a core metal 206 rigidly fixed to the back side of the elastic member 205 by way of stoving or bonding. The core metal 206 has a lateral profile substantially in conformance with the lateral surface profile of the crawler panel 201, as best shown in FIG. 53. In the shown embodiment, since the crawler panel 201 is provided three grousers 201a, 201b and 201c at respective of both longitudinal edges and intermediate position therebetween, the core metal 206 has both longitudinal edge portions tilted upwardly along the tilted surface of the grousers 201 a and 201c and a recessed central portion 206a for accommodating the grouser 201b.

Mounting bolts 208 are welded on the core metal 206 to extend the threaded stem portion 208a through holes formed in the core metal 206 and the crawler panel 201. Nuts 210 are engaged with the extended ends of the threaded stem portions 206a of the mounting bolts 206 via a spring washers 209.

It should be appreciated that although the mounting bolts 208 are rigidly fixed to the core metal 206 by way of welding in the shown embodiment, it may be possible to rigidly secure the nuts 210 on the core metal 206 so that they may engage with the mounting bolts 208 which extends from the crawler panel side.

Figure 55:
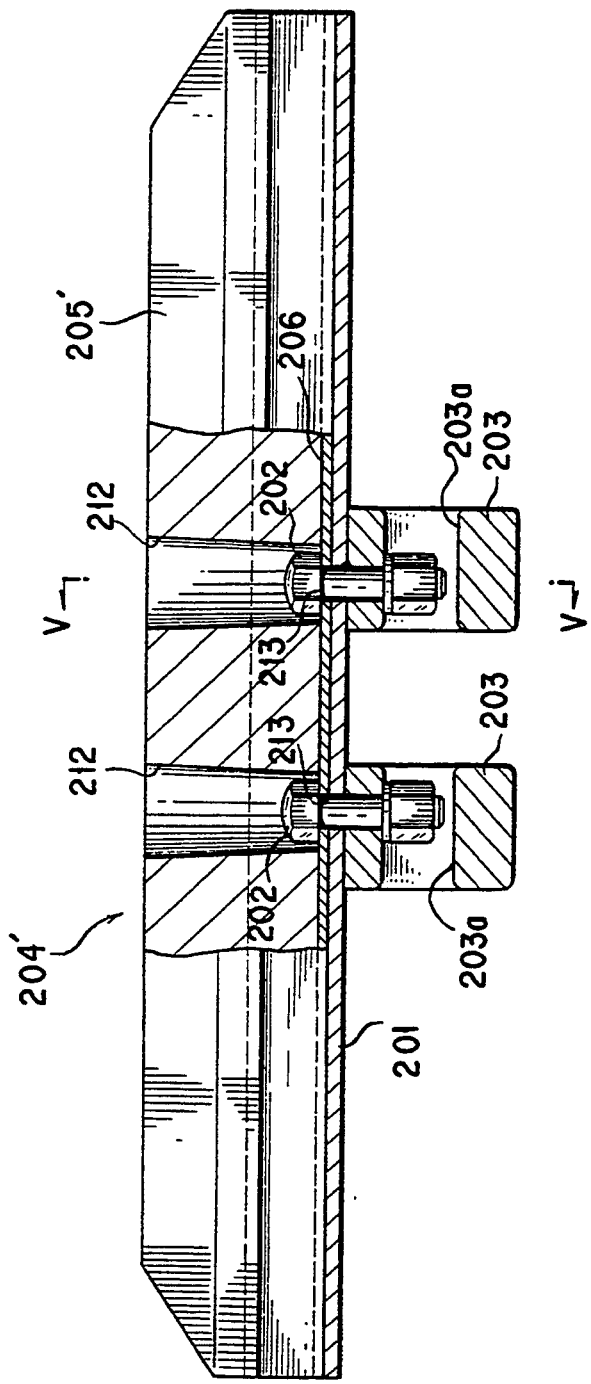
FIG. 55 is a twentieth embodiment of the crawler pad according to the present invention.
Figure 56:
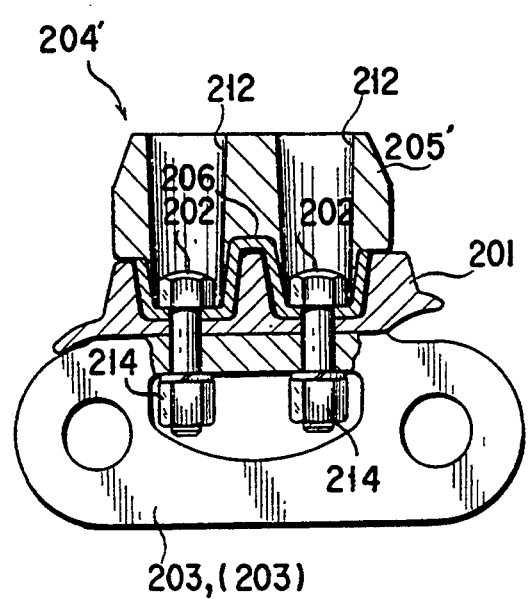
FIG. 56 is a section taken along line V—V of FIG. 55.

FIGS. 55 and 56 show the twentieth embodiment of the crawler pad according to the invention. In the shown embodiment, the link mounting bolts 202 are employed in common for securing the crawler panel 201 to the track link 203. For permitting external access of the link mounting bolts 202, outside opened openings 212 are formed through the elastic member 205' of the crawler pad 204'. Nuts 214 to engage with the link mounting bolts 202 extending through holes 213 formed in the core metal 206. The nuts 214 are received within openings 203a formed through the track links 203.

Upon assembling the shown embodiment of the crawler pad 204, the crawler pad 204 is initially placed on the tread of the crawler panel 201. Then, the link mounting bolts 202 are inserted through the openings 212 to extend the threaded stem portion through the core metal 206 and the crawler panel 201 to engage with the nuts 214 in the openings 203a of the track links 203.

Figure 57:
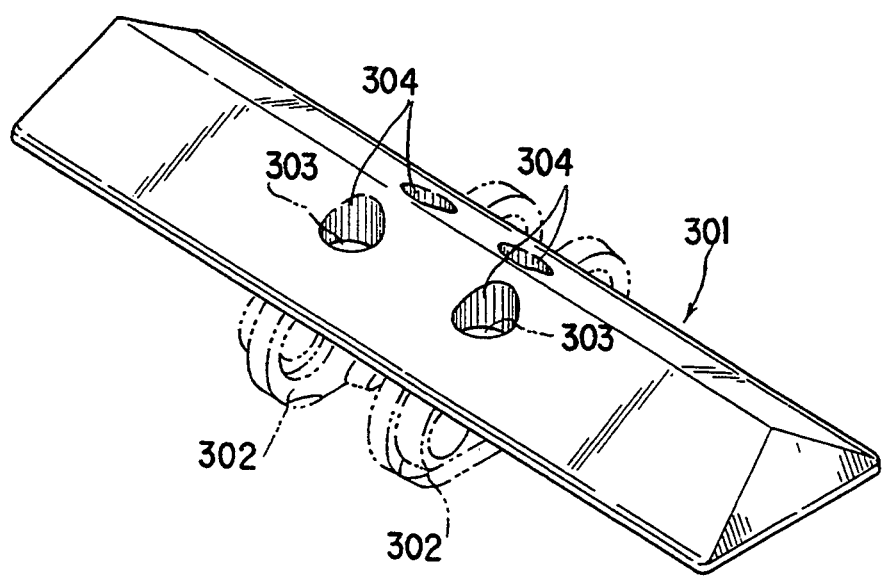
FIG. 57 is a perspective view of a wet type crawler pad.
Figure 58:
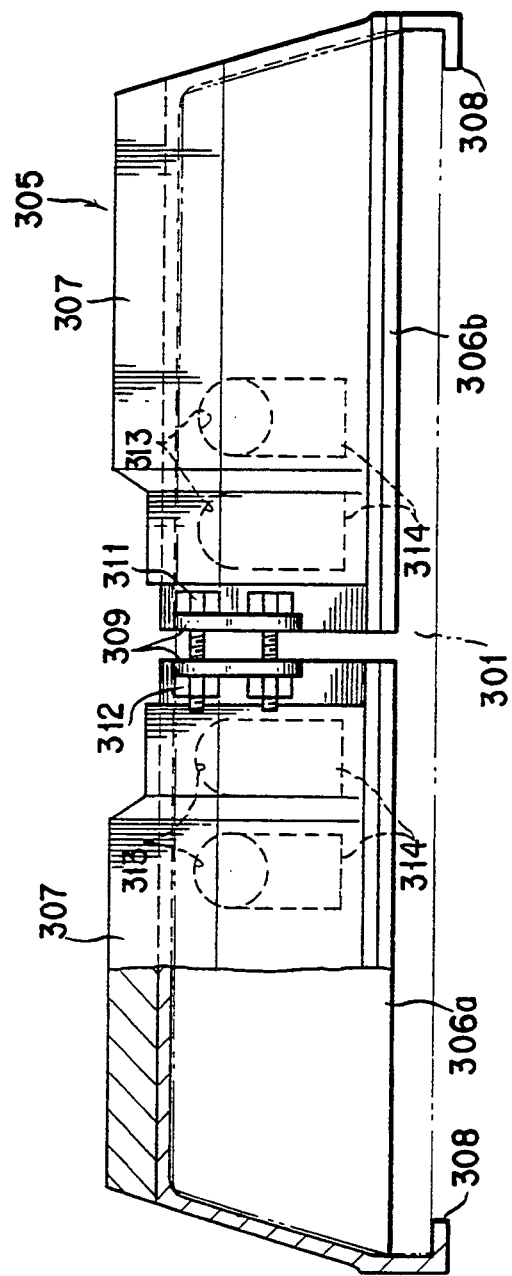
FIG. 58 is a partially sectioned front elevation of the twenty-first embodiment of the crawler pad according to the invention.
Figure 59:
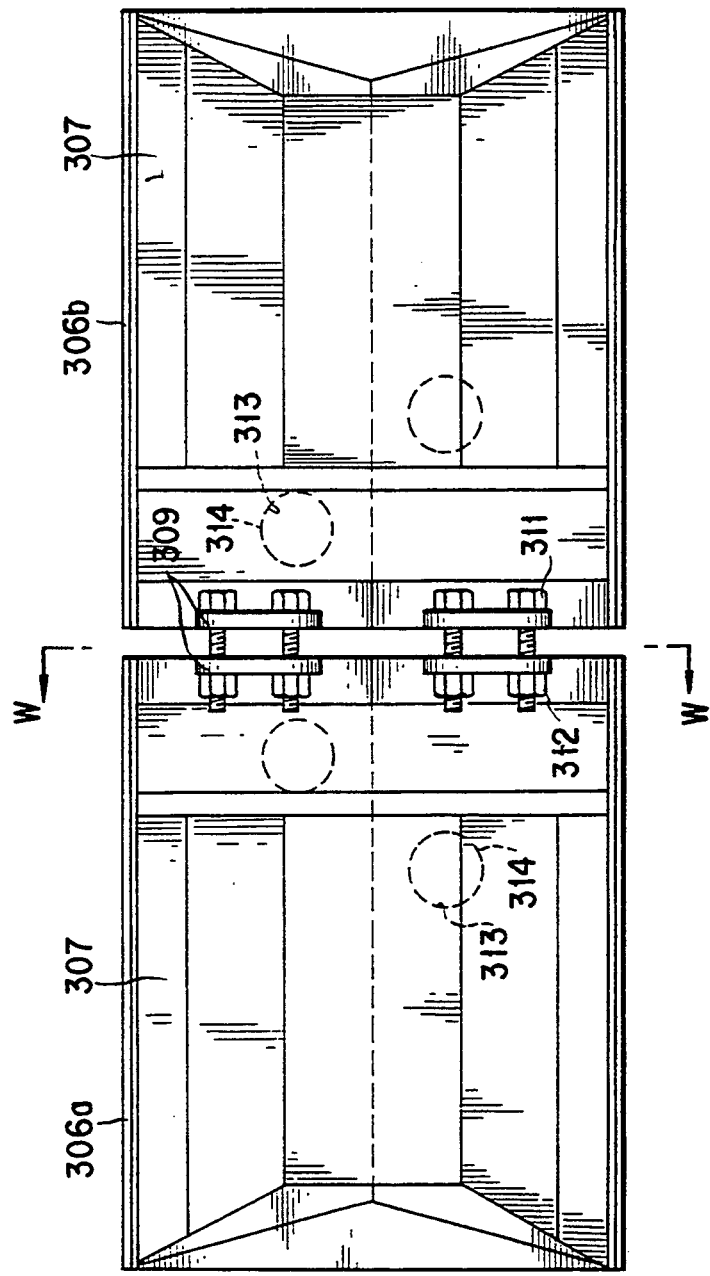
FIG. 59 is a plan view of the crawler pad of FIG. 58.
Figure 60:
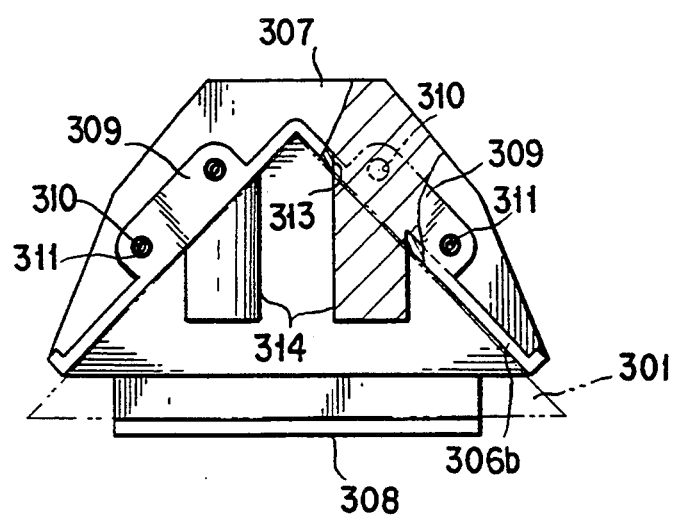
FIG. 60 is a section taken along line W—W of FIG. 59.
Figure 61:
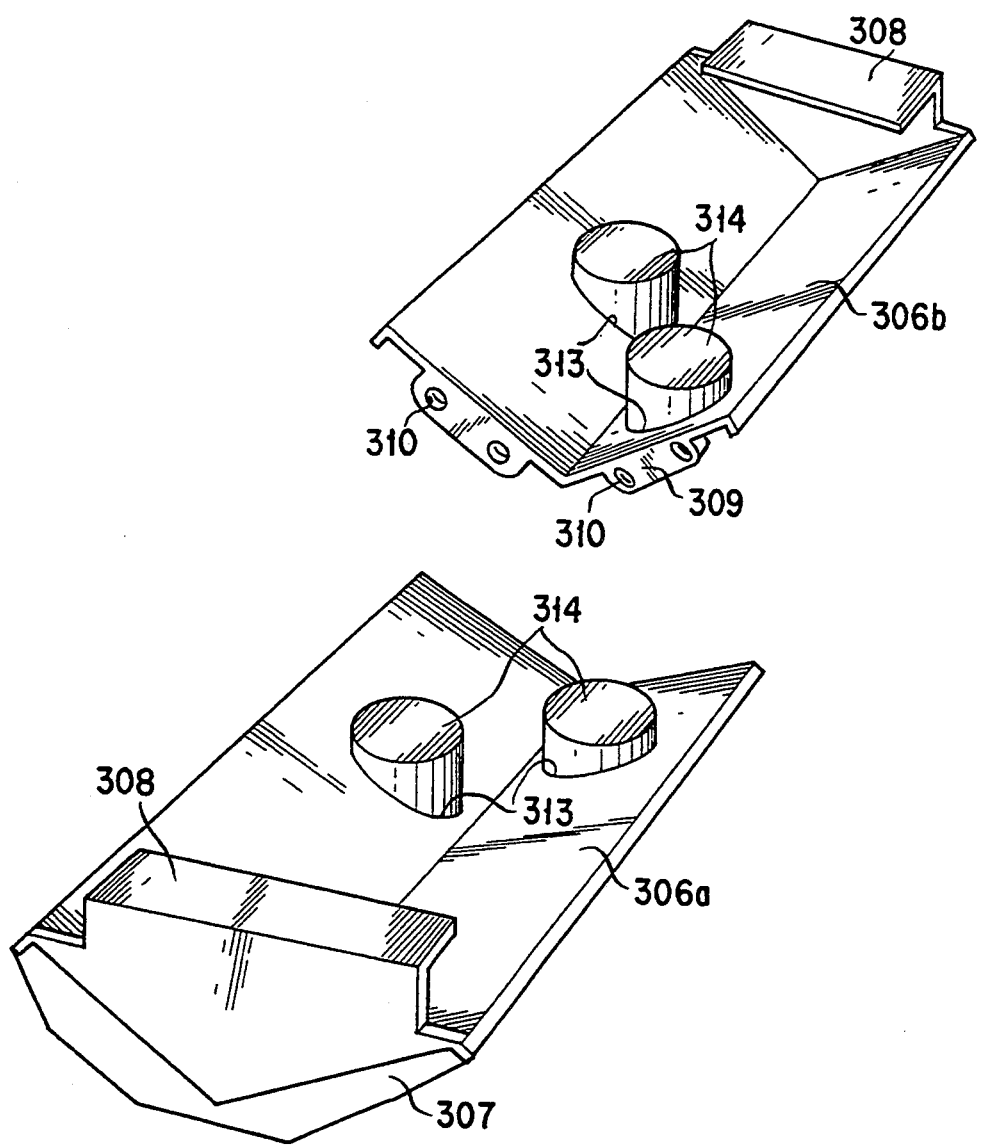
FIG. 61 is a exploded perspective view of the twenty-first embodiment of the crawler pad as viewed in upside down.

FIG. 57 shows a crawler panel to be employed in a bulldozer or shoveldozer for a wet or muddy site. As can be seen, this type of crawler panel 301 has an essentially triangular cross-section with a peak at the center of the tread surface. As shown in FIG. 57, a plurality of crawler panels 301 are chained by means of track links 302 rigidly secured by means of link mounting bolts 303 inserted through cut-out recesses 304. The twenty-first embodiment of the crawler pad according to the present invention permits the vehicle, such as the bulldozer or shoveldozer, to travel on a dry or a surfaced or paved road without damaging the road surface.

The twenty-first embodiment of the crawler pad according to the present invention is generally represented by the reference numeral 305. The crawler pad 305 has a backside surface formed into a configuration generally conforming with the tread configuration of the crawler panel 301 to accommodate the later therein. The crawler pad 305 has separated core metals 306a and 306b, and elastic members 307, 307 secured on respective core metals 306a and 306b by way of stoving. The elastic members 307 are formed of an elastic material, such as a synthetic rubber.

The core metals 306a and 306b have longitudinal outer ends corresponding respective longitudinal ends of the crawler panel 301, at which engaging hooking portions 308 are formed in order to hook on the backside of the crawler panel 301 as shown. The core metals 306a and 306b also have the longitudinal inner ends mutually opposing to each other. Flanges 309 are fixed at respective inner ends. The flanges 309 are formed with a plurality of bolt holes 310 to accommodate bolts 311. Respective bolt holes of the flanges 309 are aligned to permit the bolts 311 to extend therethrough. Nuts 312 engages with the bolts 311 for rigidly coupling the flanges 309 to each other and whereby coupling the core metals 306a and 306b to each other. The core metals 306a and 306b are further formed with through openings 313 to be positioned an alignment with respective of the cut-out recesses 304 of the crawler panel 301.

The elastic members 307, 307 are formed into essentially truncated triangular cross-section having inclined surfaces substantially along the inclined surfaces of the crawler panel 301. The elastic members 307, 307 are provided with projections 314 at the position corresponding to the through openings 313 of the core metal 306a and 306b. The projections 314 extend through the through openings 313 to engage with the cut-out recesses 304.

In the shown construction, the crawler pad 305 is assembled to the crawler panel 301, by initially hooking the hooking portions 308 to the backside of the crawler panel 301 at the longitudinal ends. In conjunction therewith, the projections 314 extending through the through openings 313 of the core metals 306a and 306b elastically engage with the cut-out recesses. Engagement of the projections 314 and the cut-out recesses 304 assures restriction of play of the crawler pad 305 relative to the crawler panel 301. Then, by tightening the nuts 312 to the bolts 311, the core metals 306a and 306b are coupled to each other and firmly secured on the crawler panel 301.

Figure 62:
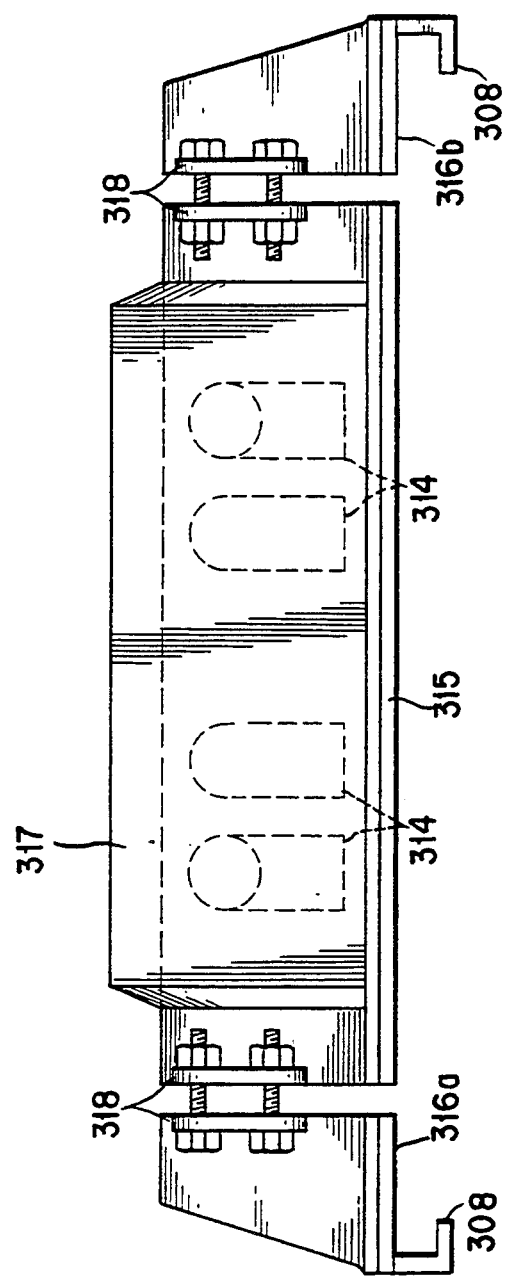
FIG. 62 is a front elevation of a modification of the twenty-first embodiment of the crawler pad.
Figure 63:
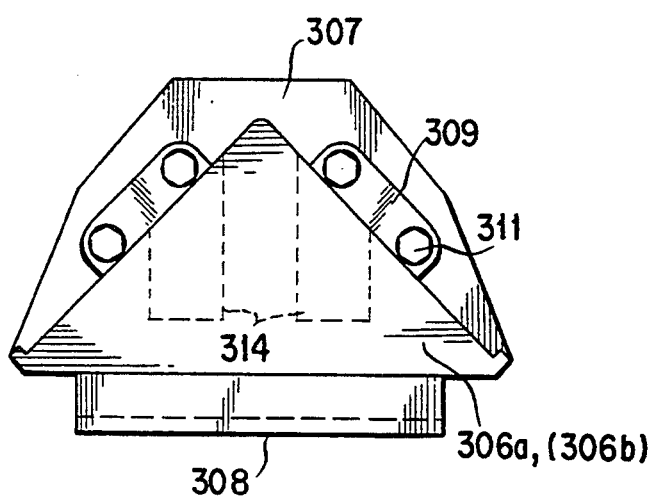
FIG. 63 is a side elevation of the crawler pad of FIG. 62.
Figure 64:
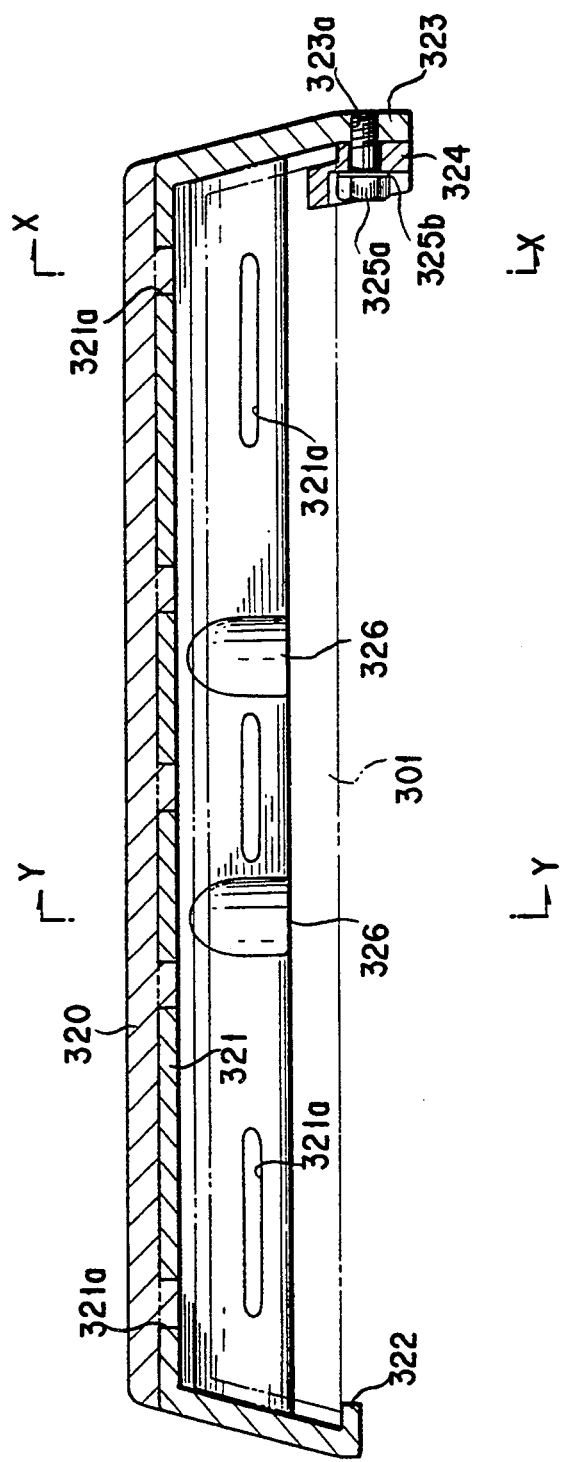
FIG. 64 is a longitudinal section of a further modification of the twenty-first embodiment of the crawler pad.
Figure 65:
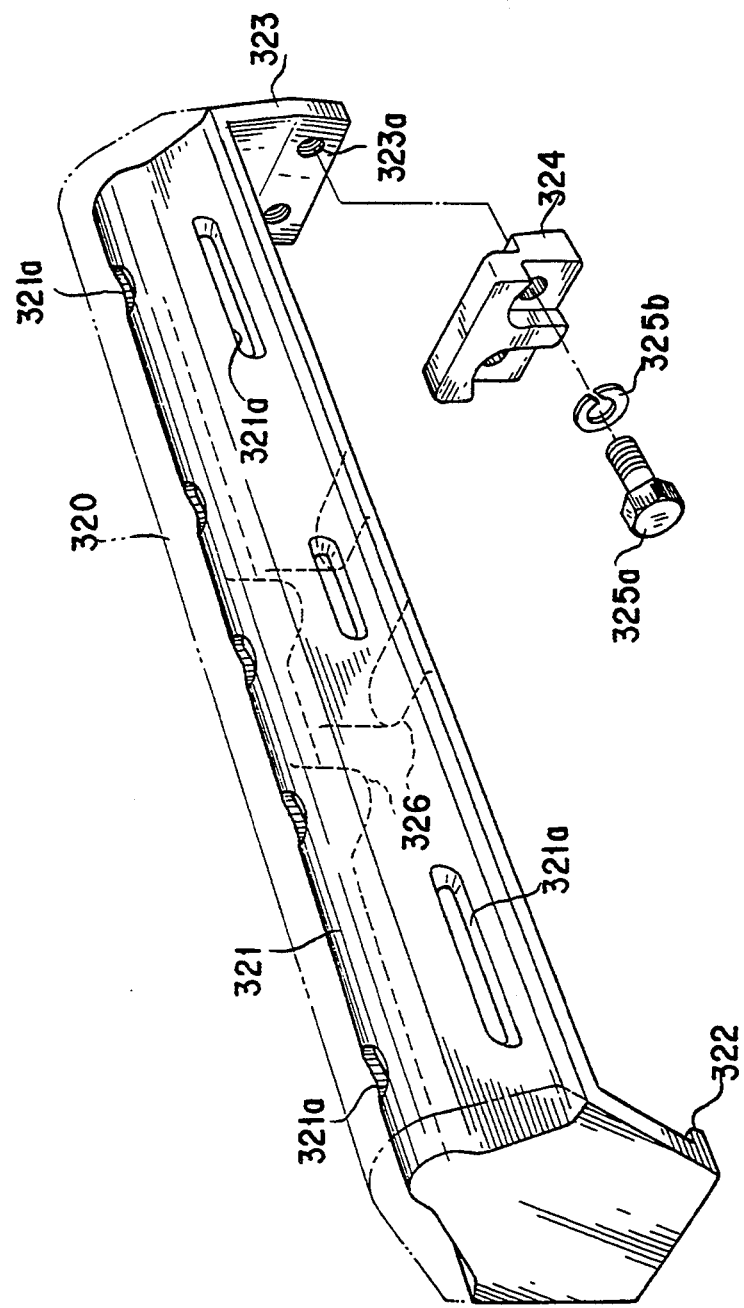
FIG. 65 is a exploded perspective view of the core metal in the crawler pad of FIG. 64.
Figure 66:
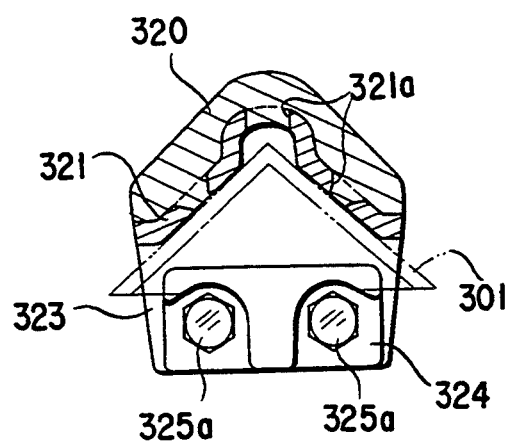
FIG. 66 is a section taken along line X—X of FIG. 64.
Figure 67:
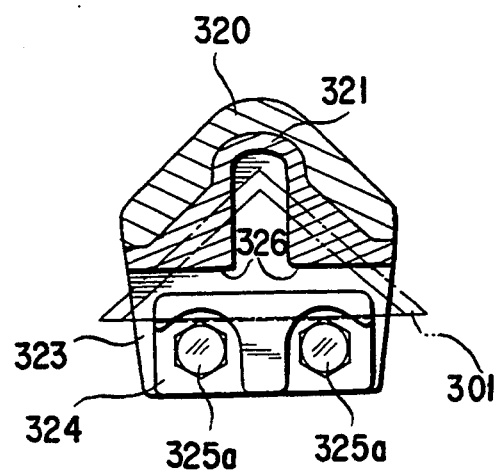
FIG. 67 is a section taken along line Y—Y of FIG. 64.

FIGS. 62 and 63 show a modification of the twenty-first embodiment of the crawler pad. In the shown embodiment, the crawler pad is constituted of three segments. Namely, the core metals are separated into the end segments 306a and 306b and a central segment 315. The hooking members 308 are provided on the end segments 306a and 306b. The elastic member 317 for forming the tread of the crawler pad is fixed only on the central segment 315. Similarly to the forgoing embodiment, the elastic member 317 is integrally formed with the projections 314 to engage with the cut-out recesses 304.

Respective of the end segments 316a and 316b and the central segment 315 are provided with the flanges 318 which are fixedly coupled by means of bolts 311 and nuts 312 in the manner substantially the same as that for the former embodiment.

It should be noted that although the shown embodiment has the elastic member 317 provided only on the central segment 315, the elastic member may also be provided on the end segments 316a and 316b. Also, thin elastic members may be fitted on the backside surfaces of the end segments 316a, 316b and the central segment 315. In addition, the end segments 316a and 316b and the central segment 315 can be formed as bent metal plates or cast blocks.

FIGS. 64 to 67 show another modification of the twenty-first embodiment of the crawler pad according to the invention. In the shown embodiment, a core metal 321, on which an elastic member 320 is secured, is formed into a one piece construction to be fitted on the entire tread surface of the crawler panel. The core metal 321 is formed with a fixed hooking member 322 at one longitudinal end. The other longitudinal end of the core metal 321 carries an engaging tongue 323. Threaded holes 323a are formed through the engaging tongue 323. To the engaging tongue 323, a detachable hooking member 324 is mounted by means of bolts 325a which engage with the threaded holes 323a via a washers 325b. A plurality of projections 326 are formed integrally with the core metal 321, which projections 326 are adapted to engage with the cut-out recesses 304 of the crawler plate. Also, the core metal 321 is formed with a plurality openings to permit the elastic member 320 for forming the tread can extend to the backside of the core metal 321 through holes 321a.

Upon assembling, the crawler pad is fitted on the thread surface of the crawler panel with engaging the hooking member 322 to the backside of the crawler plate. Thereafter, the detachable hooking member 324 is secured to the engaging tongue 323 by means of the bolts 325a so that the crawler pad is coupled with the crawler panel.

Figure 68:
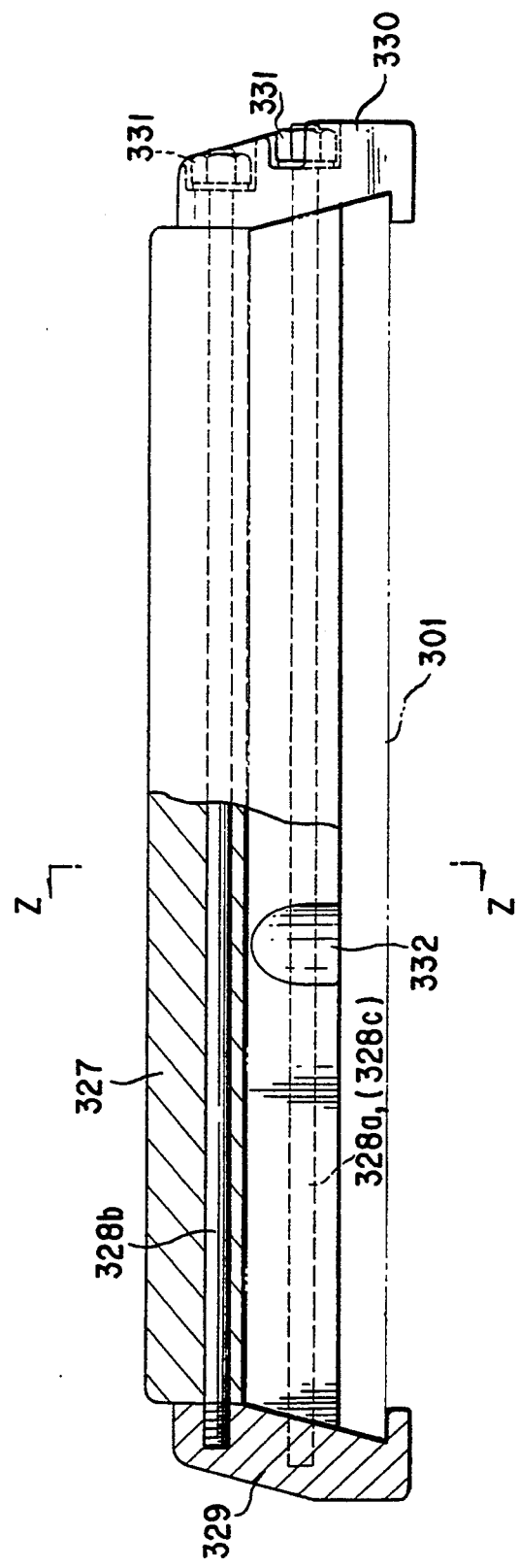
FIG. 68 is a partially sectioned front elevation of a further modification of the twenty-first embodiment of the crawler pad according to the invention.
Figure 69:
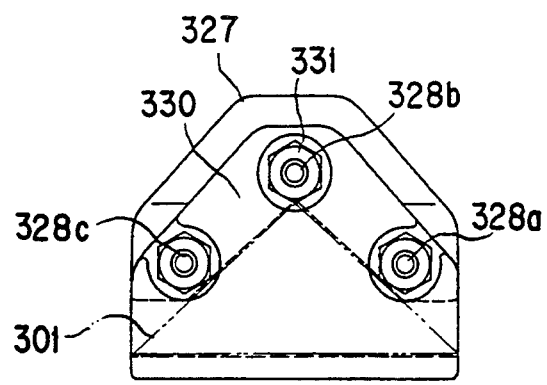
FIG. 69 is a side elevation of the crawler pad of FIG. 68.
Figure 70:
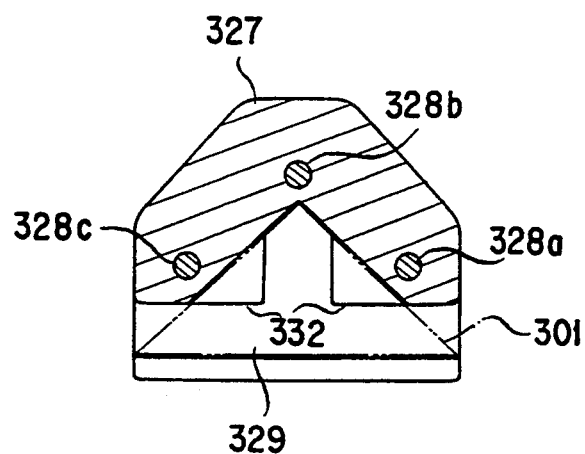
FIG. 70 is a section taken along line Z—Z of FIG. 69.
Figure 71:
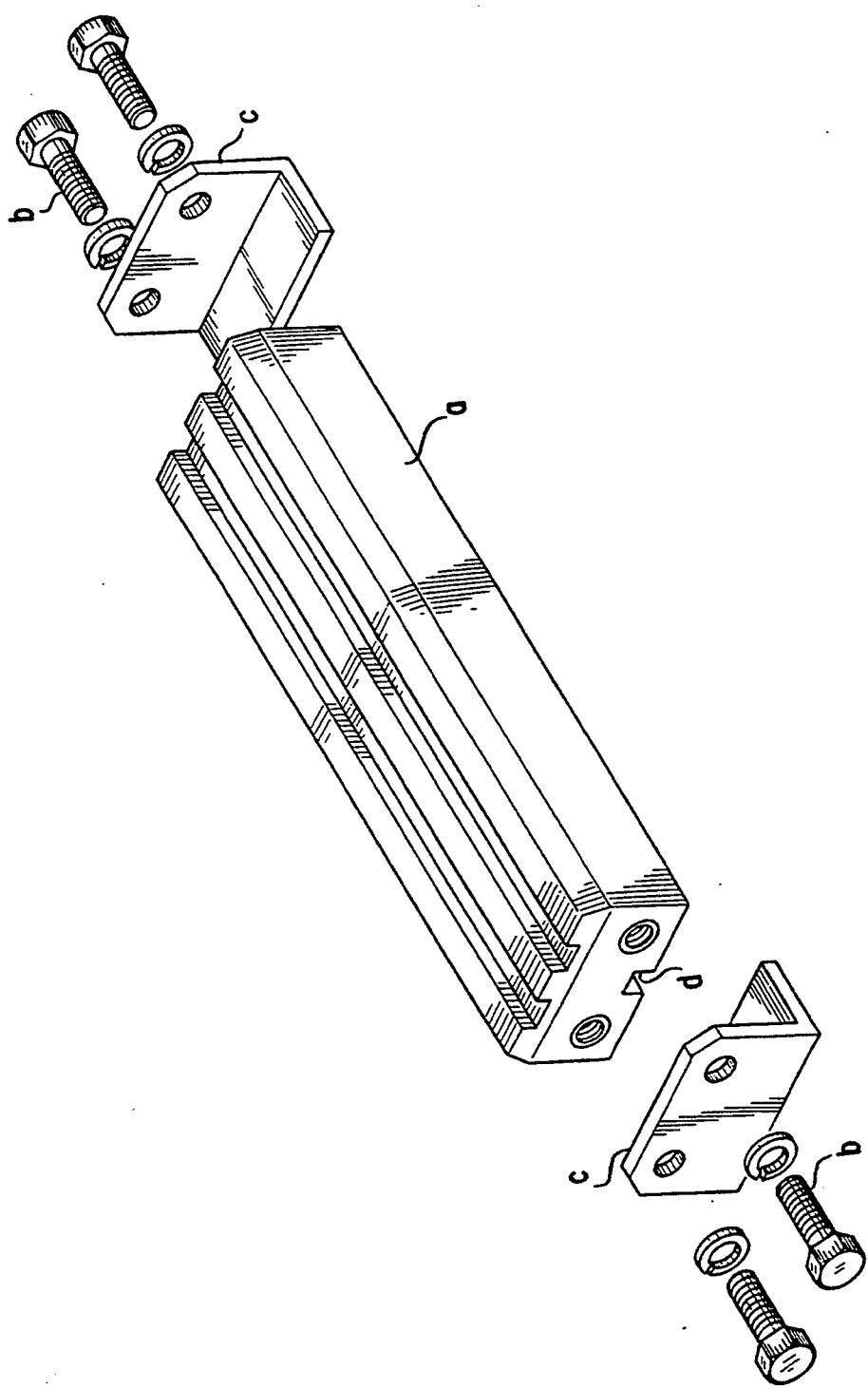
FIG. 71 is an exploded perspective view showing the construction of the conventional crawler pad.

FIGS. 68 to 70 show a still further modification of the twenty-first embodiment of the crawler pad. In the shown embodiment, the crawler pad generally comprises an elastic member 327. A plurality of, three in the shown case, reinforcements 328a, 328b and 328c are extended through overall length of the elastic member 327. The reinforcements 328a, 328b and 328c are threadingly secured to a fixed hooking member 329 at one ends. Detachable hooking member 330 is engaged to the other ends of the reinforcements 328a, 328a and 328a and fixed thereto by means of nuts 331. Similarly to the foregoing embodiments, the projection is integrally formed with the elastic member 327 for engagement with the cut-out recesses 304.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A crawler pad to be mounted on a tread surface of a crawler plate forming a crawler for forming an elastic tread for protecting a road surface, comprising:
   an elastic member forming the tread of the crawler pad;
   a reinforcement supporting said elastic member, said reinforcement having first and second outer ends;
   a fixed hook means integrally formed with said reinforcement at said first outer end thereof for engaging with a first edge of said crawler plate;
   a detectable hook means detachably secured to said second outer end of said reinforcement for engaging with a second edge of said crawler plate, said detectable hook means having an outermost portion spaced from said second outer end of said reinforcement; and pl a fastening means for firmly engaging with said reinforcement for firmly securing said detachable hook means to said second outer end of said reinforcement, said fastening means having an inner end portion engaging said second outer end of said reinforcement and an outer end portion disposed between said outermost portion of said detachable hook means and said second outer end of said reinforcement.

2. A crawler pad as set forth in claim 1, wherein a seat position of said detectable hook means to be fitted to said second outer end of said reinforcement is shifted inwardly from a portion of the detachment hook means to be engaged with the second edge of the crawler plate.

3. A crawler pas set forth in claim 1, wherein a seat position of said detectable hook means to be fitted to said second outer end of said reinforcement is shifted inwardly from an adjacent end of said elastic member.

4. A crawler pad as set forth in claim 1, wherein a grouser receptacle portion is formed in said reinforcement for engaging with a grouser provided on said tread surface of said crawler plate.

5. A crawler pad as set forth in claim 1, wherein said reinforcement is formed with an engaging portion for engaging with a link mounting bolt for restricting displacement of said crawler pad in a running direction of said crawler.

6. A crawler pad as set forth in claim 5, wherein said engaging portion for engaging with said link mounting bolt comprises an engaging hole.

7. A crawler pad as set forth in claim 5, wherein said engaging portion for engaging with said link mounting bolt comprises a contact plate contacting with said link mounting bolt in the running direction of said crawler.

8. A crawler pad as set forth in claim 5, wherein said engaging portion engages with a plurality of link mounting bolts and said engaging portion comprises plate members externally contacting with a plurality of said link mounting bolts.

9. A crawler pad as set forth in claim 5, wherein said engaging portion engages with a plurality of link mounting bolts and said engaging portion comprises plate members arranged for internally contacting with respective link mounting bolts.

10. A crawler pad as set forth in claim 5, wherein said engaging portion comprises a pipe member engaging with said link mounting bolt.

11. A crawler pad as set forth in claim 5, wherein said reinforcement comprises a frame-like base, on which said elastic member is rigidly secured.

12. A crawler pad as set forth in claim 5, wherein said reinforcement comprises a metal core and said engaging portion comprises an engaging member rigidly fixed to said metal core.

13. A crawler pad as set forth in claim 5, wherein said reinforcement comprises a metal core and said engaging portion comprises an engaging member integrally formed with said metal core.

14. A crawler pad as set forth in claim 5, wherein a part of said detachable hook means is buried within said elastic member.

15. A crawler pad as set forth in claim 1, wherein said reinforcement is provided with an engaging member for engaging with a grouser formed on the tread surface of said crawler plate.

16. A crawler pad to be mounted on a tread surface of a crawler plate forming a crawler for forming an elastic tread for protecting a road surface, comprising:
   an elastic forming the tread of the crawler pad;

a reinforcement supporting said elastic member, said reinforcement having first and second outer ends;

a fixed hook means integrally formed with said reinforcement at said first outer end thereof for engaging with a first edge of said crawler plate;

a detachable hook means detactably secured to said second outer end of said reinforcement for engaging with a second edge of said crawler plate, said detachable hook means having an outermost portion spaced from said second outer end of said reinforcement;

an engaging means provided in said reinforcement for engaging with a link mounting bolt projecting from the tread surface of said crawler plate for restricting displacement of said crawler pad in a running direction of said crawler; and a fastening means for firmly engaging with said reinforcement for firmly securing said detachable hook means to said second outer end of said reinforcement, said fastening means having an inner end portion engaging said second outer end of said reinforcement and an outer end portion disposed between said outermost portion of said detachable hook means and said second outer end of said reinforcement.

17. A crawler pad as set forth in claim 16, wherein said engaging means for engaging with said link mounting bolt comprises an engaging hole.

18. A crawler pad as set forth in claim 16, wherein said engaging means for engaging with said link mounting bolt comprises a contact plate contacting with said link mounting bolt in the running direction of said crawler.

19. A crawler pad as set forth in claim 16, wherein said engaging means engages with a plurality of link mounting bolts and said engaging means comprises plate members externally contacting with a plurality of said link mounting bolts.

20. A crawler pad as set forth in claim 16, wherein said engaging means engages with a plurality of link mounting bolts and said engaging means comprises plate members arranged for internally contacting with respective link mounting bolts.

21. A crawler pad as set forth in claim 16, wherein said engaging means comprises a pipe member engaging with said link mounting bolt.

22. A crawler pad as set forth in claim 16, wherein said reinforcement comprises a frame-like base, on which said elastic member is rigidly secured.

23. A crawler pad as set forth in claim 16, wherein said reinforcement comprises a metal core and said engaging means comprises an engaging member rigidly fixed to said metal core.

24. A crawler pad as set forth in claim 16, wherein said reinforcement comprises a metal core and said engaging means comprises an engaging member integrally formed with said metal core.

25. A crawler pad as set forth in claim 16, wherein a part of said detachable hook means is buried within said elastic member.

26. A crawler pad to be mounted on a tread surface of a crawler plate forming a crawler and having a grouser on said tread surface, for forming an elastic tread for protecting a road surface, comprising:

an elastic member forming the tread of the crawler pad;

a reinforcement supporting said elastic member, said reinforcement having first and second outer ends;

an engaging member extending from said reinforcement for contacting with said tread surface of said crawler plate and engaging with said grouser;

a fixed hook means integrally formed with said reinforcement at said first outer end thereof for engaging with a first edge of said crawler plate;

a detachable hook means detachably secured to said second outer end of said reinforcement for engaging with a second edge of said crawler plate, said detachable hook means having an outermost portion spaced from said second outer end of said reinforcement; and a fastening means for firmly engaging with said reinforcement for firmly securing said detachable hook means to said second outer end of said reinforcement, said fastening means having an inner end portion engaging said second outer end of said reinforcement and an outer end portion disposed between said outermost portion of said detachable hook means and said second outer end of said reinforcement.

27. A crawler pad as set forth in claim 26, wherein a leg member to contact with said tread surface of said crawler plate is extended from a side of said reinforcement facing said tread surface.

28. A crawler pad as set forth in claim 26, wherein the tread surface of said elastic member is formed into an uneven profile for better traction.

29. A crawler pad as set forth in claim 26, wherein a frame is extended from longitudinal sides of said reinforcement within said elastic member.

30. A crawler pad as set forth in claim 26, wherein said elastic member comprises a major portion formed of a relatively softer material and a plurality of harder portions formed of a relatively harder material.

31. A crawler pad as set forth in claim 26, wherein a plurality of spikes are implanted in said elastic member.

32. A crawler pad as set forth in claim 26, wherein said engaging member comprises an engaging hole.

33. A crawler pad as set forth in claim 26, wherein said engaging member comprises a contact plate contacting with a link mounting bolt in the running direction of said crawler.

34. A crawler pad as set forth in claim 26, wherein said engaging member engages with a plurality of link mounting bolts and said engaging member comprises plate members externally contacting with a plurality of said link mounting bolts.

35. A crawler pad as set forth in claim 26, wherein said engaging member engages with a plurality of link mounting bolts and said engaging member comprises plate members for internally contacting with respective link mounting bolts.

36. A crawler pad as set forth in claim 26, wherein said engaging member comprises a pipe member engaging with a link mounting bolt.

37. A crawler pad as set forth in claim 26, wherein said reinforcement comprises a frame-like base, on which said elastic member is rigidly secured.

38. A crawler pad as set forth in claim 26, wherein said reinforcement comprises a metal core and said engaging member is rigidly fixed to said metal core.

39. A crawler pad as set forth in claim 26, wherein said reinforcement comprises a metal core and an engaging member integrally formed with said metal core.

40. A crawler pad as set forth in claim 26, wherein a part of said detachable hook means is buried within said elastic member.

41. A crawler pad to be mounted on a tread surface of a crawler plate forming crawler and having a grouser on said tread surface, for forming an elastic tread for protecting a road surface, comprising;
   an elastic member forming the tread of the crawler pad, said elastic member engaging with said grouser and contacting with said tread surface of said crawler plate;
   a reinforcement supporting said elastic member, said reinforcement having first and second ends and comprising a flat plate portion extending in parallel to said tread surface of said crawler plate, said flat plate portion having a surface side for facing away from said tread surface and a back side for facing said tread surface, said flat plate portion being fitted with said elastic member on both of said surface side and said back side thereof, said back side of said flat plate portion forming a backwardly opened box-shaped configuration;
   a fixed hook means integrally formed with said reinforcement at said first end thereof through a stepped portion for engaging with a first edge of said crawler plate; and
   a detachable hook means formed with stepped configuration and detachably secured at said second end of said reinforcement for engaging with a second edge of said crawler plate.

42. A crawler pad as set forth in claim 41, wherein said flat plate portion comprises first and second longitudinal side edges, said backwardly opened box-shaped configuration being defined by first and second side plates extending from said first and second longitudinal side edges of said flat plate portion, said side plates having ends which are rigidly connected to said fixed hook means.

43. A crawler pad as set forth in claim 41, wherein said fixed hook means and said detachable hook means are formed with a receptacle for receiving said grouser of said crawler plate.

44. A crawler pad as set forth in claim 41, wherein said elastic members are terminated at longitudinal positions slightly inside of the longitudinal ends of said flat plate portion of said crawler plate.

45. A crawler pad as set forth in claim 41, wherein a width of said elastic member at a surface side thereof is selected to position opposite ends of said elastic member inside of the first and second edges of said crawler plate.

46. A crawler pad to be mounted on a tread surface of a crawler plate forming a crawler for forming an elastic tread for protecting a road surface, comprising:
   an elastic member forming the tread of the crawler pad;
   a reinforcement supporting said elastic member, said reinforcement having first and second outer ends;
   a fixed hook means integrally formed with said reinforcement at said first out end thereof for engaging with a first edge of said crawler plate;
   a detachable hook means detachably secured to said second outer end of said reinforcement for engaging with a second edge of said crawler plate, said detachable hook means having an outermost portion spaced from said second outer end of said reinforcement;
   a fastening means for firmly engaging with said reinforcement for firmly securing said detachable hook to said second outer end of said reinforcement, said fastening means having an inner end portion engaging said second outer end of said reinforcement and an outer end portion disposed between said outermost portion of said detachable hook means and said second outer end of said reinforcement; and
   a fixing means for fixing said reinforcement to said crawler plate for restricting displacement of said crawler pad relative to said crawler plate.

47. A crawler pad as set forth in claim 46, wherein said fixing means comprises a cut-out formed in one of said crawler plate and said reinforcement and an engaging tongue engaging with said cut-out and formed in the other of said crawler plate and said reinforcement.

48. A crawler pad as set forth in claim 47, wherein said crawler plate has a grouser fixed thereto and said cut-out is formed through said grouser.

49. A crawler pad as set forth in claim 46, wherein said fixing means comprises bolts extending through both of said crawler panel and said reinforcement.

50. A crawler pad as set forth in claim 49, wherein said crawler plate has a grouser fixed thereto and said bolts extend through said grouser and said reinforcement.

51. A crawler pad to be mounted on a tread surface of a crawler plate forming a crawler and having a grouser on said tread surface, for forming an elastic tread for protecting a road surface, comprising:
   an elastic member forming the tread of the crawler pad, said elastic member engaging with said grouser and contacting with the tread surface of said crawler plate;
   a reinforcement supporting said elastic member, said reinforcement having first and second ends and comprising a flat plate portion extending in parallel to said tread surface of said crawler plate, said flat plate portion having a surface side for facing away from said tread surface and a back side for facing said tread surface, said flat plate portion being fitted with said elastic member on both of said surface side and said back side thereof, said back side of said flat plate portion forming a backwardly opened box-shaped configuration;
   a fixed hook means integrally formed with said reinforcement at a first end thereof through a stepped portion for engaging with a first edge of said crawler plate, said fixed hook means having a receptacle for receiving said grouser of said crawler plate;
   a detachable hook means formed with stepped configuration and detachably secured at said second end of said reinforcement for engaging with a second edge of said crawler plate, said detachable hook means having a receptacle for receiving said grouser of said crawler plate.

52. A crawler pad to be mounted on a tread surface of a crawler plate forming a crawler for forming an elastic tread for protecting a road surface, comprising:
   an elastic member forming the tread of the crawler pad;
   a reinforcement supporting said elastic member, said reinforcement having first and second outer ends and a back side for facing said crawler plate;
   a fixed hook means integrally formed with said reinforcement at said first outer end thereof for engaging with a first edge of said crawler plate;
   a detachable hook means detachably secured to said second outer end of said reinforcement for engaging with a second edge of said crawler plate, said detachable hook means having an outermost portion spaced outwardly from said second outer end of said reinforcement;

a fastening means for firmly securing said detachable hook means to said second outer end of said reinforcement, said fastening means having an inner end portion engaging said second outer end of said reinforcement and an outer end portion disposed between said outermost portion of said detachable hook means and said second outer end of said reinforcement; and means, located at the back side of said reinforcement, for defining a receptacle for receiving at least one link mounting bolt.

53. A crawler pad to be mounted on a tread surface of a crawler plate forming a crawler and having a grouser on said tread surface, for forming an elastic tread for protecting a road surface, comprising:

an elastic member forming the tread of the crawler pad, said elastic member engaging with said grouser and contacting with said tread surface of said crawler plate;

a reinforcement supporting said elastic member, said reinforcement having first and second ends and a surface side for facing away from said tread surface and a back side for facing said tread surface, said reinforcement comprising a flat plate portion having first and second longitudinal sides extending in parallel to said tread surface of said crawler plate and side plates extending from said longitudinal sides of said flat plate portion in a direction toward said tread surface for forming a backwardly opened box-shaped configuration, said reinforcement being fitted with said elastic member on both of the surface side and the back side thereof;

a fixed hook means integrally formed with said reinforcement at said first end thereof through a stepped portion for engaging with a first edge of said crawler plate;

a detachable hook means formed with stepped configuration and detachably secured at said second end of said reinforcement for engaging with a second edge of said crawler plate; and means, located at the back side of said reinforcement, for defining a receptacle for receiving at least one link mounting bolt.

* * * * *